(12) United States Patent
Pedross-Engel et al.

(10) Patent No.: US 12,529,782 B2
(45) Date of Patent: Jan. 20, 2026

(54) SYSTEMS AND METHODS FOR IMAGE BEAT PATTERN MITIGATION

(71) Applicant: THRUWAVE INC., Seattle, WA (US)

(72) Inventors: Andreas Pedross-Engel, Seattle, WA (US); Claire M. Watts, Seattle, WA (US); Matthew S. Reynolds, Seattle, WA (US)

(73) Assignee: ThruWave Inc., Seattle, WA (US)

( * ) Notice: Subject to any disclaimer, the term of this patent is extended or adjusted under 35 U.S.C. 154(b) by 227 days.

(21) Appl. No.: 18/556,175

(22) PCT Filed: Mar. 31, 2022

(86) PCT No.: PCT/US2022/022757
§ 371 (c)(1),
(2) Date: Oct. 19, 2023

(87) PCT Pub. No.: WO2022/225666
PCT Pub. Date: Oct. 27, 2022

(65) Prior Publication Data
US 2024/0183976 A1    Jun. 6, 2024

Related U.S. Application Data

(60) Provisional application No. 63/178,874, filed on Apr. 23, 2021.

(51) Int. Cl.
*G01S 13/88* (2006.01)
*G01S 13/86* (2006.01)
(Continued)

(52) U.S. Cl.
CPC .......... *G01S 13/887* (2013.01); *G01S 13/867* (2013.01); *G01S 13/87* (2013.01); *G01S 13/89* (2013.01); *G06T 17/00* (2013.01)

(58) Field of Classification Search
CPC ...... G01S 13/887; G01S 13/867; G01S 13/87; G01S 13/89; G06T 17/00–30
See application file for complete search history.

(56) References Cited

U.S. PATENT DOCUMENTS

| | | | |
|---|---|---|---|
| 545,590 | A | 9/1895 | Henry |
| 5,227,800 | A | 7/1993 | Huguenin et al. |

(Continued)

FOREIGN PATENT DOCUMENTS

| | | | |
|---|---|---|---|
| CN | 107015222 A | 8/2017 |
| CN | 111144238 A | 5/2020 |

(Continued)

OTHER PUBLICATIONS

WO-2017159521-A1 translation (Year: 2017).*

(Continued)

*Primary Examiner* — Matthew M Barker
(74) *Attorney, Agent, or Firm* — Perkins Coie LLP

(57) ABSTRACT

The present application is directed to image beat pattern mitigation in two-sided reflection based 3-D millimeter wave imaging. In one example, active millimeter-wave (mmWave) imaging illuminates a scene with a source of mm Wave energy and forms images based on the reflected energy. Two-sided reflection imaging can be used to overcome the occlusion by the opaque objects that would plague a transmission imaging approach. The system can produce beat-pattern-free 3-D images of the products inside an optically-opaque corrugated cardboard shipping box and further, the two-sided reflection imaging approach with image beat pattern correction shows an increased image volume even if portions of the scene are occluded.

13 Claims, 23 Drawing Sheets

(51) Int. Cl.
  *G01S 13/87* (2006.01)
  *G01S 13/89* (2006.01)
  *G06T 17/00* (2006.01)

(56) References Cited

U.S. PATENT DOCUMENTS

| | | | |
|---|---|---|---|
| 5,642,393 | A | 6/1997 | Krug et al. |
| 7,183,963 | B2 * | 2/2007 | Lee .................. G01S 13/87 |
| | | | 342/25 R |
| 8,350,747 | B2 | 1/2013 | DeLia et al. |
| 9,123,093 | B1 | 9/2015 | Schumacher |
| 10,782,404 | B2 | 9/2020 | Safavi-Naeini et al. |
| 11,379,693 | B1 | 7/2022 | Fry |
| 12,184,122 | B2 | 12/2024 | Kelly |
| 2002/0032515 | A1 | 3/2002 | Bai et al. |
| 2005/0104603 | A1 | 5/2005 | Peschmann et al. |
| 2006/0066728 | A1 | 3/2006 | Batur |
| 2006/0214835 | A1 | 9/2006 | Lee et al. |
| 2007/0009085 | A1 | 1/2007 | Otani et al. |
| 2007/0230657 | A1 | 10/2007 | Garms |
| 2008/0152082 | A1 | 6/2008 | Bouchard et al. |
| 2009/0002220 | A1 | 1/2009 | Lovberg et al. |
| 2009/0175411 | A1 | 7/2009 | Gudmundson et al. |
| 2009/0284405 | A1 | 11/2009 | Salmon et al. |
| 2010/0005044 | A1 | 1/2010 | Bowring et al. |
| 2011/0181300 | A1 | 7/2011 | Bowring et al. |
| 2015/0186839 | A1 | 7/2015 | Chen et al. |
| 2015/0323664 | A1 | 11/2015 | Wu et al. |
| 2016/0252646 | A1 | 9/2016 | Sarraiocco |
| 2016/0264255 | A1 | 9/2016 | Connor et al. |
| 2016/0275441 | A1 | 9/2016 | Barber et al. |
| 2016/0356886 | A1 * | 12/2016 | Valdes .................. G01S 13/003 |
| 2018/0173161 | A1 * | 6/2018 | Chen .................. G01V 8/005 |
| 2019/0019316 | A1 | 1/2019 | Govindasamy et al. |
| 2019/0139441 | A1 | 5/2019 | Akella et al. |
| 2019/0146500 | A1 | 5/2019 | Yalla et al. |
| 2019/0182499 | A1 | 6/2019 | Richert |
| 2019/0277999 | A1 | 9/2019 | Chen et al. |
| 2019/0383927 | A1 | 12/2019 | Mihajlovic et al. |
| 2020/0171548 | A1 | 6/2020 | Li et al. |
| 2020/0191913 | A1 | 6/2020 | Zhang et al. |
| 2020/0320731 | A1 | 10/2020 | Sheen et al. |
| 2020/0344470 | A1 | 10/2020 | Shen et al. |
| 2021/0109206 | A1 | 4/2021 | Li et al. |
| 2021/0133666 | A1 | 5/2021 | Eckman et al. |
| 2021/0364629 | A1 | 11/2021 | Ryder et al. |
| 2022/0057519 | A1 | 2/2022 | Goldstein et al. |
| 2022/0230366 | A1 | 7/2022 | Hallgren et al. |
| 2022/0404294 | A1 | 12/2022 | Takayama et al. |
| 2023/0079634 | A1 | 3/2023 | Reynolds et al. |

FOREIGN PATENT DOCUMENTS

| | | | |
|---|---|---|---|
| CN | 112305542 A | 2/2021 | |
| DE | 102013011239 A1 | 1/2015 | |
| JP | 10153655 A | 6/1998 | |
| JP | 2006267102 A | 10/2006 | |
| JP | 2007218661 A | 8/2007 | |
| JP | 2008007324 A * | 1/2008 | |
| WO | WO-2017159521 A1 * | 9/2017 | ............. G01S 13/89 |
| WO | 2018147929 A2 | 8/2018 | |
| WO | 2020027591 A1 | 2/2020 | |

OTHER PUBLICATIONS

JP2008007324 translation. (Year: 2008).*
Supplemental European Search Report issued by European Patent Office for European Patent No. 22785179.7 on Jan. 8, 2025, 4 pages. (Year: 2025).*
International Search Report and Written Opinion issued for PCT/US2022/022757, mailed on Jun. 24, 2022, xx pages, by U.S. International Search Authority.
Pedross-Engel et al., "A Two-Sided Reflection-Based K-Band 3-D Millimeter-Wave Imaging Sisystem With Image Beat Patter Mitigation," IEEE Transactions on Microwave Theory and Techniques, vol. 69, No. 11, Nov. 2021 downloaded from the Internet <https://ieeexplore.Ieee.org/document/9442356> downloaded on May 28, 2022 (May 28, 2022), date of publication May 29, 2021 (May 26, 2021) entire document, especially FIG. 1-10; pp. 5046-5049.
Notice of Rejection issued in Japanese Patent Application 2023-564385 on Mar. 19, 2024 by Japanese Patent Office.
European Search Report for European Patent Application No. 22792183.0 dated Oct. 17, 2024, 9 pages.
Japanese Notice of Allowance issued for Japanese Patent Application No. 2023-562264 and mailed Oct. 1, 2024.
Japanese Notice of Allowance issued for Japanese Patent Application No. 2023-562267 on Jun. 4, 2024.
Japanese Notice of Allowance issued for Japanese Patent Application No. 2023-564385 on Aug. 3, 2024. /M.M.
Japanese Notice of Rejection issued for Japanese Patent Application No. 2023-562264 mailed Apr. 16, 2024.
Japanese Notice of Rejection issued for Japanese Patent Application No. 2023-562267 on Feb. 27, 2024.
Supplemental European Search Report issued by European Patent Office for European Patent Application No. 22785179.7 on Oct. 17, 2024, 17 pages.
European communication issued for European Patent Application No. 22785180.5 dated May 6, 2025, 4 pages.
European Search Report issued for European Patent Application No. 22785180.5 dated Sep. 6, 2024, 10 pages.
International Search Report and Written Opinion issued for PCT/US2022/022749, mailed on Jun. 14, 2022, 25 pages, by U.S. International Search Authority.
Liu et al. "Blind image restoration with sparse priori regularization for passive millimeter-wave images." Journal of Visual Communication and Image Representation 40 (2016): 58-66. Jun. 15, 2016 (Jun. 15, 2016) Retrieved on May 23, 2022 (May 23, 2022) from <https://www.sciencedirect.com/science/article/abs/pii/S1047323016300980> entire document.
Supplemental European Search Report issued by the European Patent Office for European Application No. 22785179.7 dated Oct. 17, 2024, 17 pages.
Shchepetilnikov et al., "New Ultra-Fast Sub-Terahertz Linear Scanner for Postal Security Screening", International Journal of Infrared and Millimeter Waves, May 7, 2020, retrieved from internet <http://terasense.com/wp-content/uploads/2020/10/New-Ultra-Fast-Sub-Terahertz-Linear-Scanner.pdf> entire document.
International Search Report and Written Opinion issued for PCT/US2022/022754, mailed on Jul. 29, 2022, 13 pages, by U.S. International Search Authority.

* cited by examiner

SYSTEMS AND METHODS FOR IMAGE BEAT PATTERN MITIGATION

CROSS-REFERENCE TO RELATED APPLICATION

This application claims the benefit of and priority to U.S. Provisional Patent Application No. 63/178,874, filed Apr. 23, 2021, the disclosure of which is incorporated herein by reference in its entirety.

TECHNICAL FIELD

The present disclosure relates to systems and methods for image beat pattern mitigation in two-sided reflection based 3-D millimeter wave imaging.

SUMMARY

Active millimeter-wave (mmWave) imaging illuminates a scene with a source of mmWave energy and forms images based on the reflected energy. When imaging objects (such as packaged goods in commerce) that have a mixture of opaque and translucent parts, two-sided reflection imaging can be used to overcome the occlusion by the opaque portions of objects that would plague a transmission imaging approach. However, the two-sided reflection imaging approach can suffer from wavelength dependent beat patterns when coherently combining the images from each side. The preferred embodiments successfully mitigate this image beat pattern. In an example, a two-sided K-band three dimensional (3D) mmWave imaging system achieves system resolutions of $\delta x=17.07$ mm, $\delta y=4.62$ mm, and $\delta z=7.26$ mm, with accuracy of 0.8 mm in the y and z directions. It is shown that the system is capable of producing beat-pattern-free 3-D images of the products inside an optically-opaque corrugated cardboard shipping box, and that the two-sided approach with image beat pattern correction shows an increased image volume even if portions of the scene are occluded.

In some embodiments, a system for producing three-dimensional millimeter wave images of an object can include a first array of millimeter wave transmitting and receiving antennas arranged in a first plane and operative to provide first image data, a second array of millimeter wave transmitting and receiving antennas arranged in a second plane and operative to provide second image data, and an image reconstruction processor. The object is disposed between the first array and the second array and the first image data and the second image data comprise complex-valued millimeter wave reflectivity of the object. The image reconstruction processor can be configured (e.g., programmed) to combine the first image data and the second image data using a beat pattern correction operator to yield the three-dimensional image of the object.

In some aspects of the disclosed technology, the beat pattern correction operator comprises a sum of the first image data, with a conjugate of the second image data, wherein the first image data is weighted by a first phase correction term and the second image data is weighted by a second phase correction term. In some aspects, the first phase correction term comprises a sum $(1+j)$ and the second phase correction term comprises a sum $(1-j)$, wherein j represents the imaginary unit. In various aspects, the first plane and the second plane are disposed approximately parallel to each other and on opposite sides of a conveyor. In some aspects, the object is contained within a non-metallic container. In some aspects of the disclosed technology, the image reconstruction processor employs a matched filter reconstruction algorithm to combine the first image data and the second image data using the beat pattern correction operator. In some aspects, the first array comprises millimeter wave transmitting and receiving antennas organized into two columns and arranged on the first plane and the second array comprises millimeter wave transmitting and receiving antennas organized into two columns and arranged on the second plane. In some aspects, the motion of the conveyor is parallel to the first plane and parallel to the second plane. In some aspects, the object is carried by a robot traveling between the first plane and the second plane.

In some embodiments, a method for correcting image beat patterns in a three-dimensional millimeter wave image of an object can include receiving first image data from a first array of millimeter wave transmitting and receiving antennas arranged in a first plane, receiving second image data from a second array of millimeter wave transmitting and receiving antennas arranged in a second plane, and combining the first image data and the second image data using a beat pattern correction operator to yield the three-dimensional image of the object. The object is disposed between the first array and the second array. In some aspects, the combining of the first image data and the second image data is performed by an image reconstruction processor employing a matched filter reconstruction algorithm.

It is with respect to these and other general considerations that the aspects disclosed herein have been made. Also, although relatively specific problems may be discussed, it should be understood that the examples should not be limited to solving the specific problems identified herein.

BRIEF DESCRIPTION OF THE DRAWINGS

FIG. 7B-1 illustrates an example scene of a measured image accuracy test pattern showing a 2-D slice at a fixed height z of the 3-D reconstruction at the height of the target.

FIG. 7B-2 illustrates an example scene of a measured image accuracy test pattern showing a 2-D slice at a fixed depth x of the 3D reconstruction at the depth of the target for the single-sided case.

FIG. 7C-1 illustrates an example scene of a measured image accuracy test pattern showing a 2-D slice at a fixed height z of the 3-D reconstruction at the height of the target.

FIG. 7C-2 illustrates an example scene of a measured image accuracy test pattern showing a 2-D slice at a fixed depth x of the 3D reconstruction at the depth of the target for the uncorrected two-sided case.

FIG. 7D-1 illustrates an example scene of a measured image accuracy test pattern showing a 2-D slice at a fixed height z of the 3-D reconstruction at the height of the target.

FIG. 7D-2 illustrates an example scene of a measured image accuracy test pattern showing a 2-D slice at a fixed depth x of the 3D reconstruction at the depth of the target for the corrected two-sided case.

The techniques introduced here may be better understood by referring to the following Detailed Description in conjunction with the accompanying drawings, in which like reference numerals indicate identical or functionally similar elements.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Millimeter-waves (mmWaves) possess unique advantages which make them beneficial in various imaging applications. mmWaves are electromagnetic waves in the frequency range of 15-300 GHz, with wavelengths between 1-20 mm. Many optically opaque materials, such as building materials and non-metallic packaging materials (e.g. cardboard, paper, plastics, fabrics, and wood) are largely transparent in the mmWave frequency bands. Additionally, in contrast to X-rays, mmWaves are non-ionizing electromagnetic waves, which makes them safe for humans when used at low power density. All these properties are useful for personnel screening and concealed weapon detection, which have been widely deployed in e.g. airport security screening. These existing systems are very expensive and have a very low frame rate of e.g. 0.25 Hz.

However, recent advances in the design of active coherent mmWave imagers have opened up 3-D mmWave imaging for high-throughput commercial applications outside the security arena. For example, mmWave imagers can be used to inspect building materials in construction, or automatically inspect packaged goods to count objects, detect anomalies such as missing items, damaged items, or liquid leakage, or to estimate void space inside packages to ensure efficient shipping in commerce. Unlike X-ray machines, where extra shielding is needed, low power mmWave imaging systems can be operated in close proximity to human workers without requiring large and heavy shielding tunnels.

Figure 1:
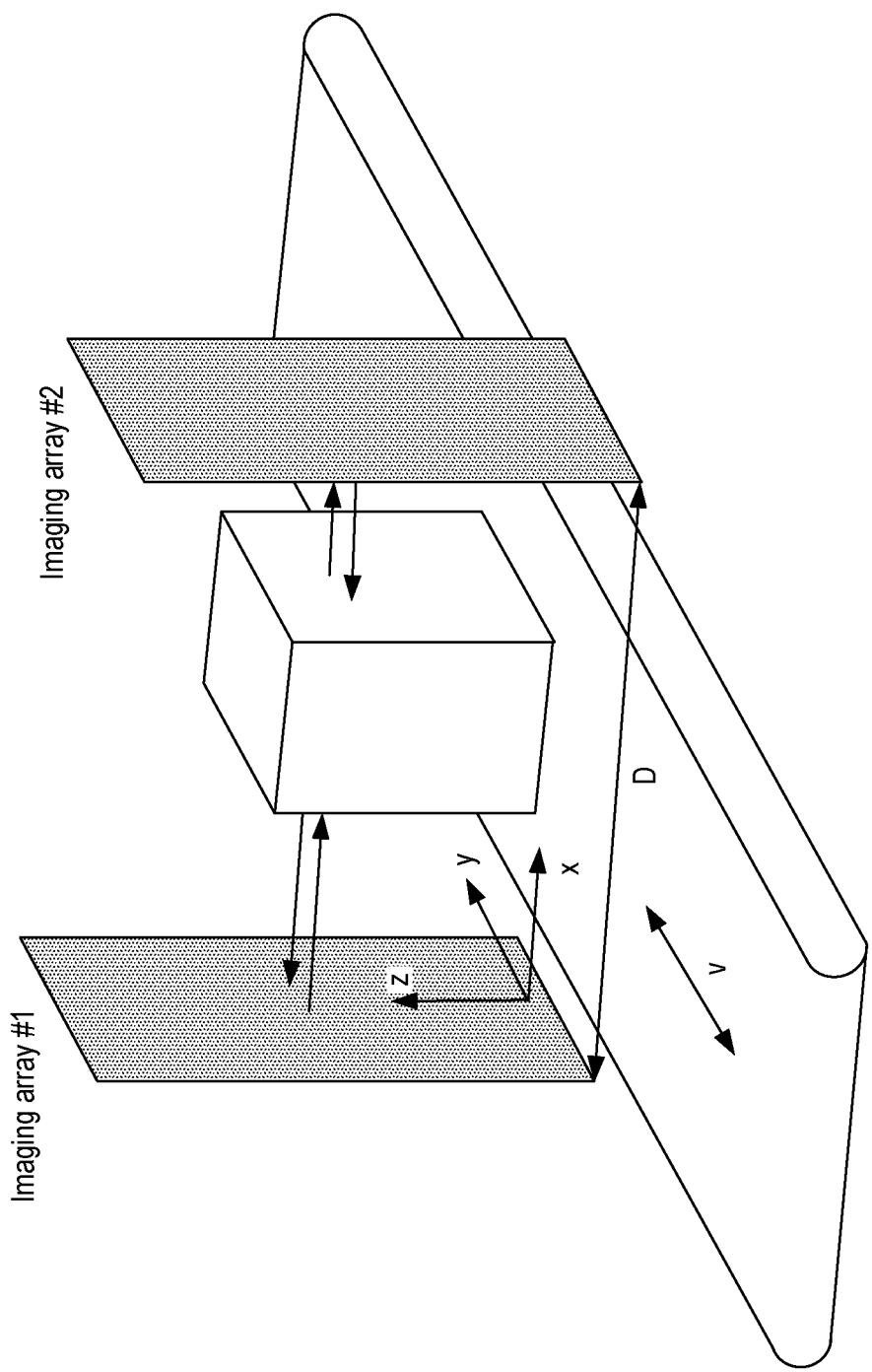
FIG. 1 is an example two-sided, reflection based 3Dmm Wave imaging system.

In applications with scenes of heterogeneous high density objects, e.g. when imaging objects such as packaged goods in commerce, visibility through the complete region of interest is limited, so a transmission-based imaging system may be undesirable. To overcome occlusion by items in the scene, a two-sided, reflection-based imaging approach is beneficial. FIG. 1 illustrates a two-sided, reflection-based 3-D mmWave imaging system. As shown in FIG. 1, each imaging array transmits energy toward the scene (red arrows) and collects the reflections from each side (blue arrows) to form the image. In systems for nondestructive inspection of layered composite materials, interrogating the composite material from two sides improves the estimate of the layered structure. Two-sided systems for automated breast imaging improve the visibility of abnormalities. In personnel security screening systems with millimeter-wave imaging arrays on two sides to detect concealed weapons and contraband on all sides of a person, the visibility of items otherwise occluded by highly reflective objects can be improved.

However, in contrast to incoherent imaging modalities, such as ordinary optical cameras, images obtained by coherent imaging systems contain not only magnitude/intensity information but also phase information for each pixel/voxel in the image. The combination of magnitude and phase information can be used to extract complex-valued features in the scene. For example, the use of complex-valued image data to extract geometric features. Another example for the use of complex-valued image data are methods to estimate material properties such as the electric permittivity of objects from complex-valued data.

To minimize computation time and model complexity for image post-processing while leveraging phase features in the scene, a single image is preferred over independent images from each side of the imager. This becomes even more critical for high-throughput applications where short analysis and reaction times are expected. Thus, it is often desirable to generate a single fused image that retains all the magnitude and phase information present in the scene.

Figure 2:
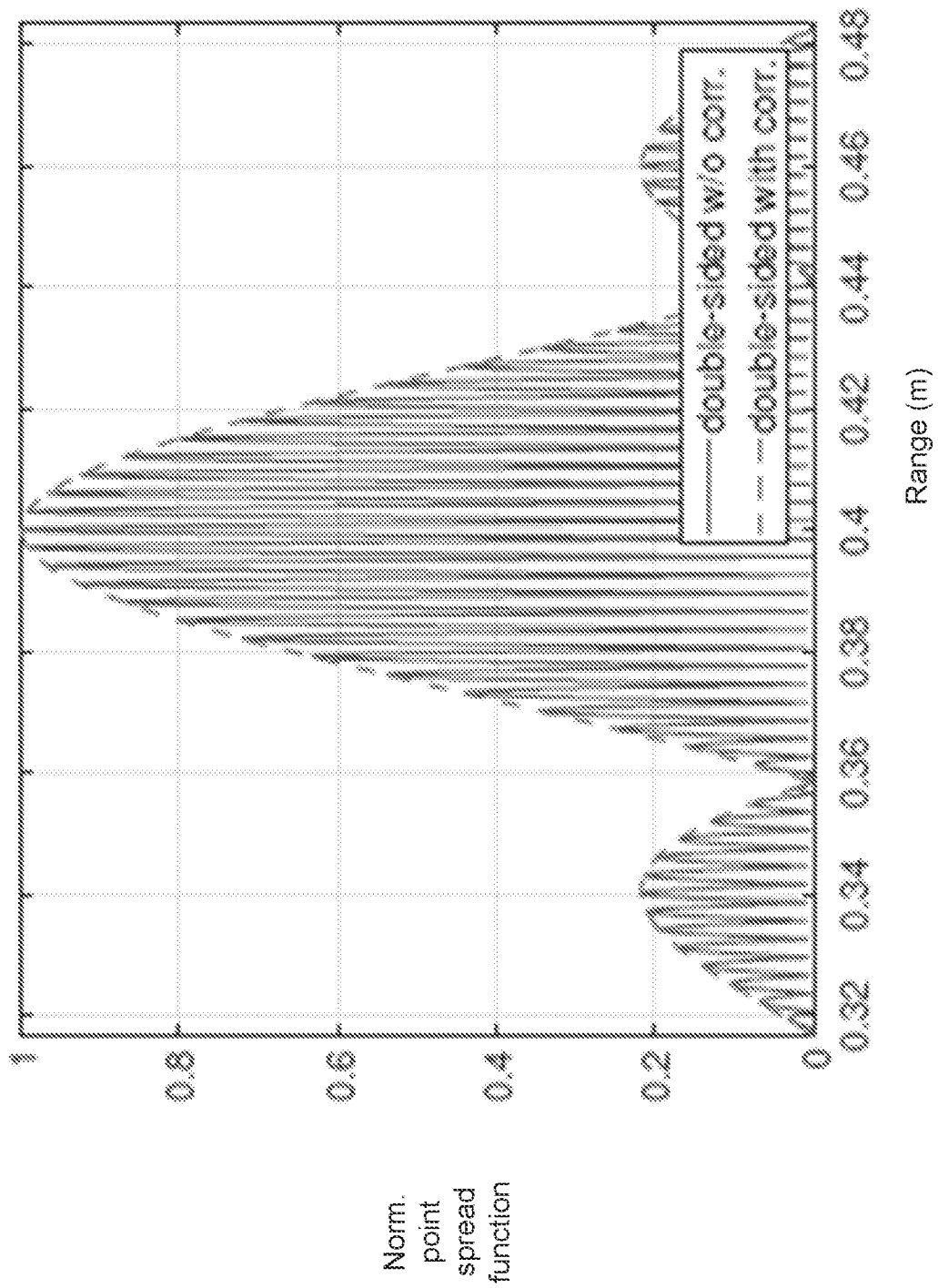
FIG. 2 is an example an example graph of a simulated range point-spread-function of a two-sided, reflection-based imaging system with and without correction for the two-sided image beat pattern applied.

A coherent summation of the images of two facing independent imaging systems leads to a beat pattern in the combined 3-D mmWave image which depends on the wavelength of the center frequency of the used interrogation signal. A simulated example of such an image beat pattern is shown in FIG. 2. FIG. 2 illustrates a simulated range point-spread-function of a two-sided, reflection-based imaging system with and without correction for of the two-sided image beat pattern applied. Approaches based on a time-domain subtraction of the two sides, where the return of one side is time-reversed are shown only for a one-dimensional scenario and cannot be generalized to higher dimension (3-D) images.

The origin of these wavelength dependent image beat patterns in two-sided 3-D mmWave imaging system is discussed, and a simple but efficient novel algorithm to mitigate these effects is proposed. An image phase modulation term is presented which makes it easy to explain and compare the phase behavior of point spread functions in one-sided and two-sided applications. Finally, this work experimentally verifies the proposed approach using measurements on two different examples of packaged goods.

Example Imaging System

FIG. 1 is an example of a two-sided 3-D mmWave imaging system. The shown system consists of two imaging arrays which obtain a sequence of synchronized mmWave frequency response measurements of an object in the scene while the object is moving through the imaging system with a constant velocity v. The two imaging arrays are deployed parallel to the motion of the object and parallel to each other with a distance D, facing each other. Note that FIG. 1 also defines the right-handed coordinate system used in this work.

Without loss of generality, we assume a single point target in the scene and mono-static mmWave sensors. The system obtains a set of N frequency response measurement $\{h_n(k)\}$ of a single point target. A single frequency response measurement is given as:

$$h_n(k) = \rho \alpha_n e^{-j2kR_n(x_0)} + v_n(k), \quad (1)$$

where j is the imaginary unit, k is the wave-number $$k = \frac{\omega}{c_0},$$

with $\omega$ being the interrogation signal angular frequency in rad/s, $c_0$ being the speed of light, $\alpha_n$ is the combined antenna gain and pathloss from the n-th measurement location to the point target, $x_0$ is the location of the point target, $R_n(x_0) = \|x_n - x_0\|$ is the distance between the n-th mmWave sensor location $x_n$ to the point target, $\rho$ is the complex-valued reflectivity of the point target, and $v_n(k)$ is measurement noise.

Applying a matched filter image formation algorithm, the resulting single-sided image $I_{ss}(x)$ is given as:

$$I_{ss}(x) = \sum_{n=1}^{N} \int_{k_1}^{k_u} h_n(k) \cdot e^{+j2kR_n(x)} dk + \tilde{v}(x) \quad (2)$$

$$= \rho B_k \sum_{n=1}^{N} \alpha_n \operatorname{sinc}(B_k[R_n(x_0) - R_n(x)]) \times$$

$$e^{-j2k_c[R_n(x_0) - R_n(x)]} + \tilde{v}(x), \quad (3)$$

where $$\operatorname{sinc}(x) = \frac{\sin(x)}{x},$$

$k_u$ ang $k_1$ being the maximum upper and minimum lower k-space frequencies with k-space center frequency $$k_c = \frac{k_u + k_1}{2}$$

and k-space bandwidth $B_k = k_u - k_1$, and v'(x) and being the noise in the image due to measurement noise $\{v_n(k)\}$. Using the first-order Taylor series expansion for the range $R_n(x) \approx e_n^T(x - x_n)$ at $x_0$, where $(\cdot)^T$ is the transpose operator and $$e_n = \frac{x_0 - x_n}{\|x_0 - x_n\|}$$

is the unit v vector pointing from $x_n$ to $x_0$, the resulting single-sided image $I_{ss}(x)$ can be approximated as:

$$I_{ss}(x) \approx \rho B_k \sum_{n=1}^{N} \alpha_n \operatorname{sinc}(B_k[e_n^T(x_0 - x)]) \times e^{-j2k_c[e_n^T(x_0 - x)]} + \tilde{v}(x). \quad (4)$$

Figure 3A:
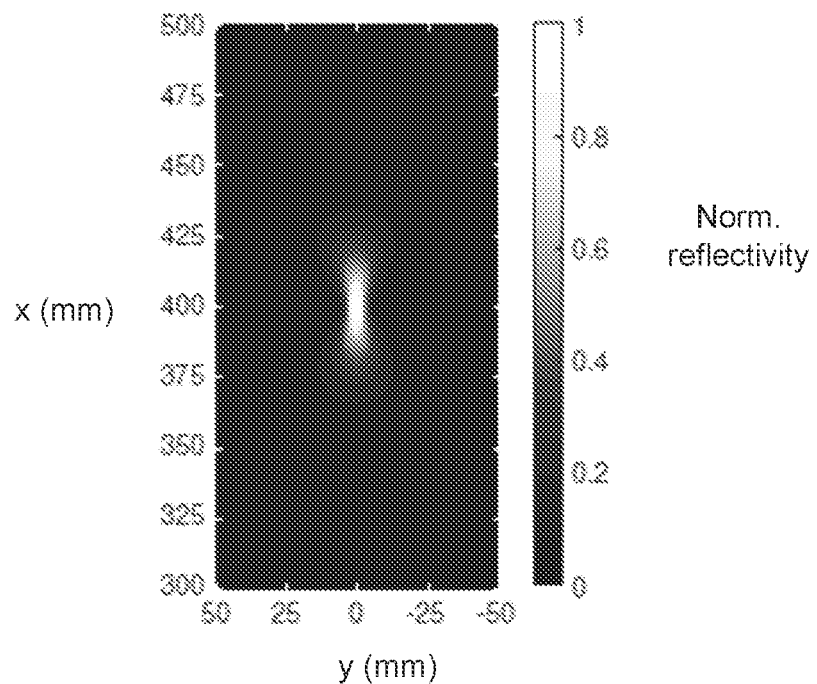
FIG. 3A illustrates an example 2D point-spread function in the (x/y) plane of a simulated point target at x=0:4 m, y=0 m, and z=0 m with single sided imaging.
Figure 3B:
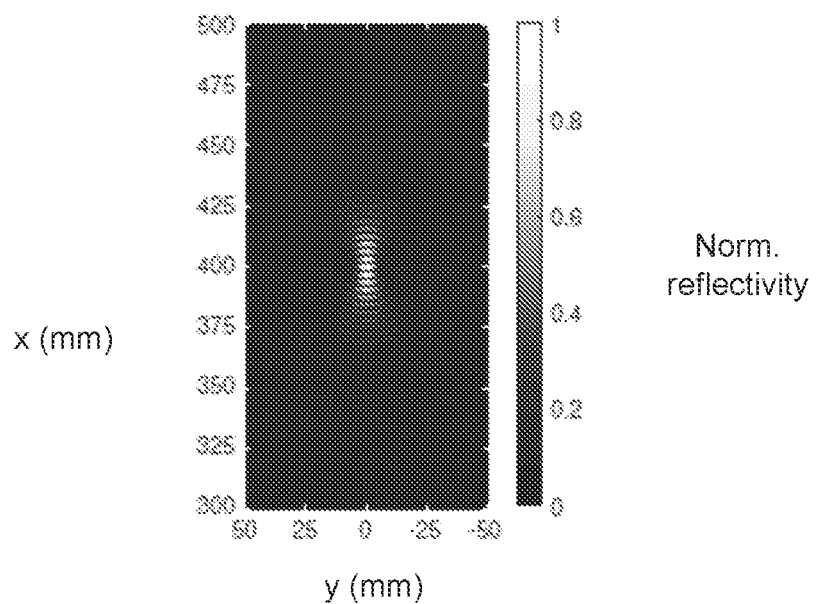
FIG. 3B illustrates an example 2D point-spread function in the (x/y) plane of a simulated point target at x=0:4 m, y=0 m, and z=0 m with uncorrected two-sided imaging.
Figure 3C:
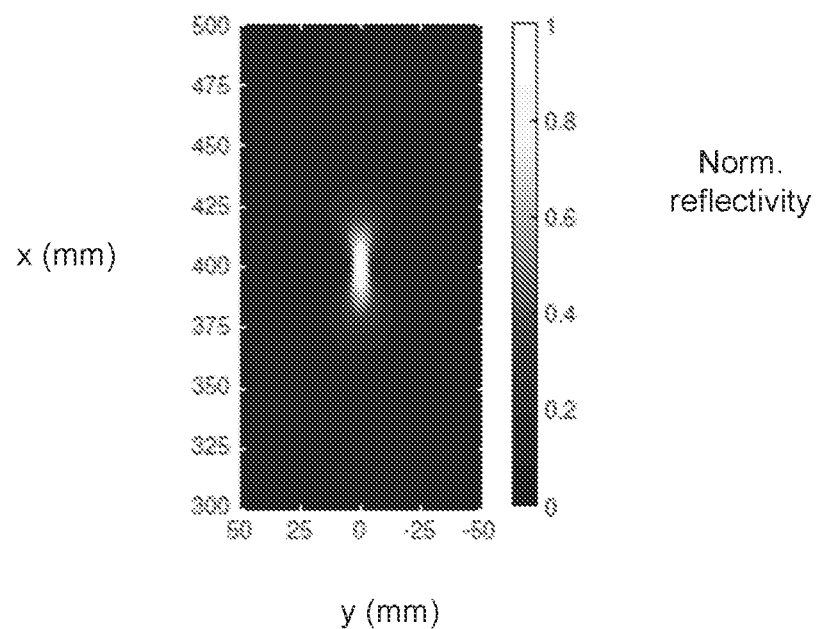
FIG. 3C illustrates an example 2D point-spread function in the (x/y) plane of a simulated point target at x=0:4 m, y=0 m, and z=0 m with two-sided imaging using the proposed image beat pattern correction.

FIG. 3A shows an example 2-D point spread function (PSF) in the (x/y) plane of a simulated point target at x=0.4 m, y=0 m, and z=0 m with single sided imaging. FIG. 3B shows an example 2-D point spread function (PSF) in the (x/y) plane of a simulated point target at x=0.4 m, y=0 m, and z=0 m with uncorrected two-sided imaging. FIG. 3C shows an example 2-D point spread function (PSF) in the (x/y) plane of a simulated point target at x=0.4 m, y=0 m, and z=0 m with two-sided imaging using the proposed image beat pattern correction. Note that all the mmWave images illustrated herein show the magnitude only, although the phase information is present in the image data. The simulated imaging system consisted of a 1-D mono-static mmWave sensor array along the y-axis, equidistantly distributed from y=−0.5 m to y=0.5 m with a spacing of Δy=5 mm. The simulated frequency responses $\{h_n(k)\}$ were computed using a bandwidth of 3.6 GHZ, a center frequency of 25 GHZ, and the ideal radiation pattern of a 10-dB WR-42 standard gain horn antenna facing along the x-dimension.

However, if the same principle as described for single sided image reconstruction is used for a two-sided imaging system as depicted in FIG. 1, the coherently combined images:

$$I_{ts}(x) = I_1(x) + I_2(x) \tag{5}$$

result in a PSF which is distorted by a periodic beat pattern along the x-axis, as illustrated in FIG. 3B.

To gain a better understanding of the source of this behavior the problem at hand needs to be simplified. Let's assume that the two-sided imaging system consists of only two mono-static mmWave sensors, facing each other at a distance D as depicted in FIG. 1. $I_1(x)$ is then the image obtained by the first image sensor looking along the x-axis and, thus, is equivalent to the single-sided image [c.f. (4)] and is given as:

$$I_1(x) \approx \rho B_k \alpha \operatorname{sinc}(B_k[e^T(x_0-x)]) \times e^{-j2k_c[e^T(x_0-x)]} + \tilde{v}(x) \tag{6}$$

and $I_2(x)$ is the image obtained by the second imaging array facing the first one at a distance D and, thus, the image is given as:

$$I_2(x) \approx \rho B_k \beta \operatorname{sinc}(B_k[f^T(x_0-x)]) \times e^{-j2k_c[f^T(x_0-x)]} + \tilde{v}(x), \tag{7}$$

where $\beta$ denotes the combined antenna gain and path loss of the second imaging array, and $f=-e=-[1,0,0]^T$ is the unit vector pointing from the second imaging system measurement positions to x0.

The resulting two-sided image $I_{ts}(x)$ is then given as:

$$I_{ts}(x) \approx 2\rho\gamma B_k \operatorname{sinc}(B_k[e^T(x_0-x)]) \times \left[\cos(2k_c[e^T(x_0-x)]) + j\frac{\Delta\gamma}{\gamma}\sin(2k_c[e^T(x_0-x)])\right] + \tilde{v}(x), \tag{8}$$

$$\text{where } \gamma = \alpha + \Delta\gamma = \beta - \Delta\gamma \text{ and } \Delta\gamma = \frac{\beta-\alpha}{2}.$$

Equation 8 exhibits a magnitude modulation term:

$$M_{ts}(x) = \cos(2k_c[e^T(x_0-x)]) + j\frac{\Delta\gamma}{\gamma}\sin(2k_c[e^T(x_0-x)]), \tag{9}$$

and equation 4 exhibits a phase modulation term:

$$M_{ss}(x) = e^{-j2k_c[e_n^T(x_0-x)]}. \tag{10}$$

The magnitude modulation term is the cause of the periodic beat pattern seen in FIG. 2 and FIG. 3B. The beat pattern is periodic with a period of $$\Delta x = \frac{\pi}{k_c} = \frac{\lambda_c}{2},$$

where $\lambda_c$ is the center frequency wavelength.

The reason why $I_{ts}(x)=I_1(x)+I_2(x)$ leads to the x-axis dependent periodic beat pattern is due to the fact that $I_2(x)$ inherently represents a complex conjugated reconstruction kernel compared to $I_1(x)$, thus, leading to cos- and sin-functions in $M_{ts}(x)$. To mitigate the two-sided PSF magnitude modulation the coherent combining of $I_1(x)$ and $I_2(x)$ needs to be slightly modified to avoid the formation of the cos- and sin-functions in $M_{ts}(x)$. The beat-pattern-corrected two-sided image $I_{cts}(x)$ is given as:

$$I_{cts}(x) = (1+j)I_1(x) + (1-j)I_2^*(x) \approx 2\rho B_k \gamma \operatorname{sinc}(B_k[e^T(x_0-x)]) \tag{11}$$

$$\times e^{-j2k_c[e^T(x_0-x)]}\left(1 - j\frac{\rho^*\Delta\gamma^*}{\rho\gamma}\right) + \tilde{v}(x). \tag{12}$$

where the (•)* operator denotes the complex-conjugate operator. Equation 12 unveils the corresponding PSF modulation term:

$$M_{cts}(x) = e^{-j2k_c[e^T(x_0-x)]}\left(1 - j\frac{\rho^*\Delta\gamma^*}{\rho\gamma}\right). \tag{13}$$

hence, a x-dependent phase modulation term only, similar to $M_{ss}(x)$. The resulting PSF is depicted in FIG. 2 and FIG. 3C, where it is shown that the image beat pattern is successfully mitigated.

Two-Sided Imaging System

The presented system consists of 24× multiple-input multiple-output (MIMO) mmWave sensor modules, 12× on two imaging arrays positioned on each sides of the conveyor (see FIG. 1) with a distance of D=1.5 m, operating in the K-band (23-26.6 GHZ) using a frequency modulated chirped waveform to illuminate the objects comprising the scene. The sensors are organized in two vertical 1-D arrays and span an array length of $L_z$=650 mm. Note that the two columns are slightly offset in y by 160 mm and in z by 50 mm. However, both columns form a single logical array. Different arrays may be constructed with different numbers of sensor modules to image larger or smaller scenes. The objects to be imaged travel along the conveyor belt in a parallel fashion past the mmWave sensor array.

In typical commercial packaged goods applications, the motion is supplied by conveyors or robotic material handling equipment with speeds up to 3 m/s (600 ft/min). An optical trigger sensor is used to trigger a measurement when an object passes by. An optical camera, a depth camera (for example a structured light camera), or a barcode reader can also be provided to obtain optical preview image or to gather additional information about the objects. It should be appreciated that other sources of motion, such as robotic material handling equipment, automated storage and retrieval system (ASRS) shuttles or bots, or any other source of motion of the imaged objects relative to the mmWave sensor modules may be employed. It should also be appreciated that either the objects may be moved relative to stationary sensors, or the sensors may be moved relative to stationary objects. The presented approach to image beat pattern mitigation is fully general and also functions to combine coherent mmWave images produced by imaging systems differing in design from that described here.

TABLE 1

Example System Parameters

| Parameter | Value |
|---|---|
| Frequency band | 23-26.6 GHz |
| Bandwidth (B) | 3.6 GHz |
| Frequency channel spacing | 2.5 MHz |
| Number of frequency samples | 91 |
| Ambiguous free range ($D_{max}$) | 3.75 m |
| Measurement frame rate ($R_{meas}$) | 83.5 Hz |
| Shutter time ($T_{shutter}$) | 718 µs |
| Chirp rate | 5 MHz/µs |
| Number of TXs per sensor | 4 |

TABLE 1-continued

Example System Parameters

| Parameter | Value |
|---|---|
| Number of RXs per sensor | 4 |
| Number of sensors | 24 |
| Vertical array size ($L_z$) | 650 mm |
| Distance between facing imaging arrays (D) | 1.5 mm |
| Conveyor speed (v) | 0.3 m/s |

Figure 4:
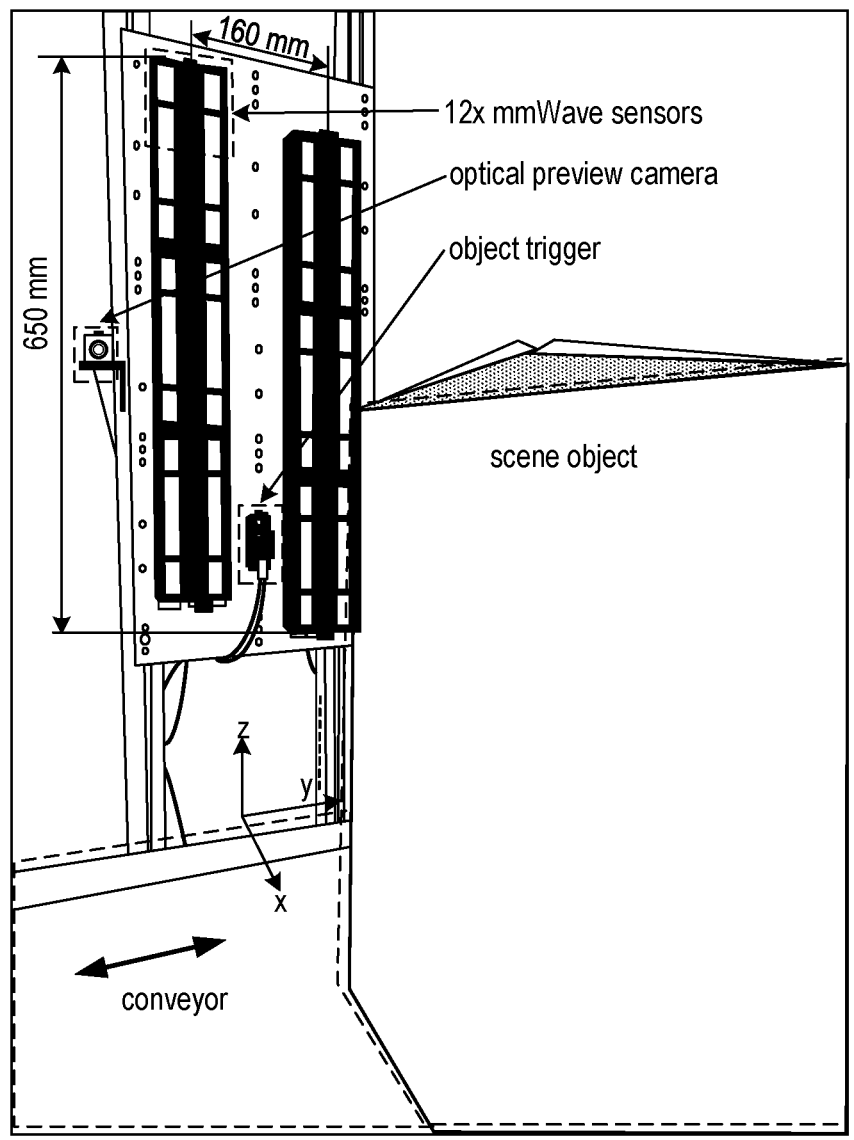
FIG. 4 is an example of one side of the conveyor-based high-throughput mmWave imaging system for packaged goods.
Figure 5:
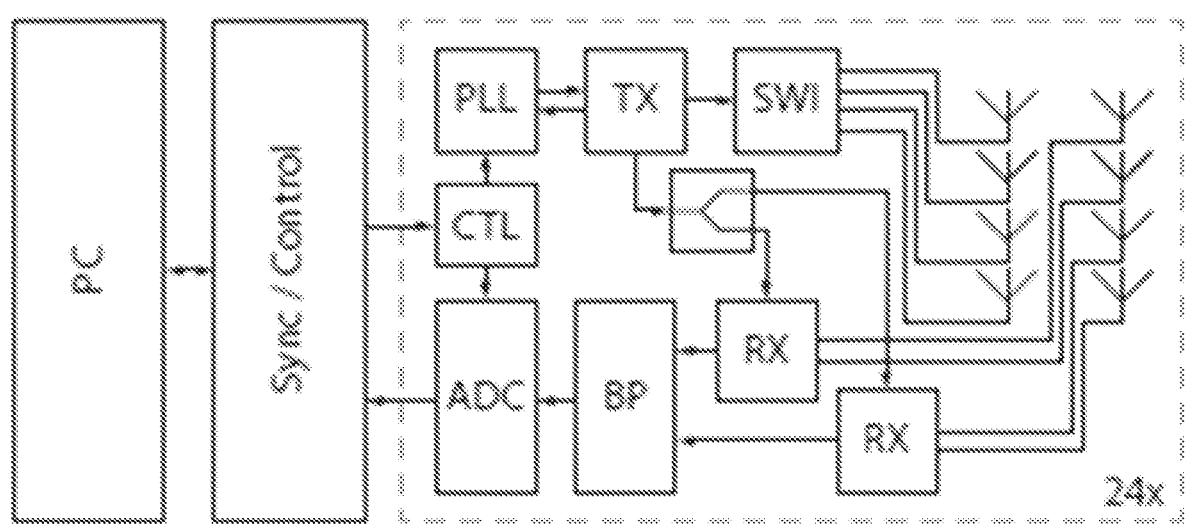
FIG. 5 is an example of system architecture for a mmWave imaging system.

FIG. 4 is an example of one side of the conveyor-based high-throughput mmWave imaging system for packaged goods. FIG. 5 illustrates the system architecture for a mmWave imaging system. Each of the 24×MIMO mmWave sensors consists of four transmit (TX) and four receive (RX) antennas. The antennas are wideband patch antennas and were designed to achieve a 60° beamwidth across a frequency band of 22-27 GHZ. The antenna configuration within the mmWave sensors was computationally optimized using a sparse periodic array approach. The TX antennas are connected to an SP4T switch (SWI) which is fed by a radar transceiver application specific integrated circuit (ASIC). The built-in voltage-controlled oscillator of the transceiver ASIC is driven by a low-noise phase locked loop (PLL) which generates chirps with B=3.6 GHz in the 23-26.6 GHz band with a chirp rate of =5 MHz/µs. The system utilizes frequency-division multiple access (FDMA) with a channel separation of 2.5 MHz to allow all 24× mmWave sensors to operate in parallel, and time-division multiple access (TDMA) to separate the returns from each of the four TX antennas per sensor to allow each sensor to operate as a 4×4 MIMO radar. Two, two-channel radar receiver ASICs per sensor are used to down-convert the received signal to I/Q baseband signals. The I/Q baseband signal is bandpass filtered (BP) for channel separation, to mitigate noise and out-of-band jamming. The baseband signal is sampled by 16 bit analog-to-digital converters (ADCs) for further processing in the digital domain. Each mmWave sensor is calibrated in an anechoic chamber using multiple spatially-distributed measurements of a backscatter fiducial based on a K-band standard gain horn before being mounted on the system. Each MIMO mmWave sensor is carefully mounted with less than 0.5 mm position error using a metal mounting frame to minimize distortions in the image, such as increased PSF side lobes.

The individual mmWave sensor modules are connected to a concentrator via a multi-lane high speed digital bus using low-voltage differential signalling (LVDS). The concentrator controls (CTL) and synchronizes all sensor modules via a system-on-chip (SOC) which combines an field-programmable gate array (FPGA) with a dual core ARM processor. The SOC also reads the optical trigger sensor and fetches the ADC samples after every sampling event and streams the sensor data over a Gigabit Ethernet link to a host PC. The host PC runs Linux and collects and stores the acquired measurement data to disk. It also hosts the image reconstruction. For fast image reconstruction, a graphics processing unit (GPU) optimized partitioned inverse image reconstruction method is used.

Results and Discussion

The preferred embodiment achieves system resolution, image accuracy, and imaging performance on packaged goods. The conveyor used in these experiments was run at its maximum feed rate of 0.3 m/s with the system settings shown in Table 1. Note that the imaging system is located in a standard laboratory/office environment. No absorbers were used to cover potential surfaces which could lead to reflections and multipath (e.g. concrete floors or metal window blinds). The objects to be scanned were placed at the start of the conveyor system, the passing object then passes in front of the optical trigger sensor, which triggers the mmWave imaging system to save the measurement data and start reconstruction as each object passes by.

Figure 6A:
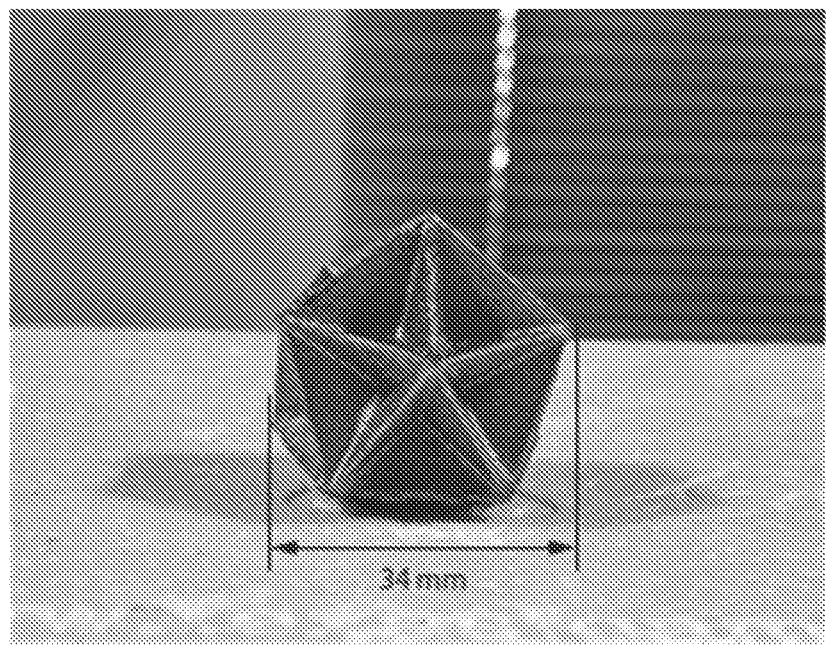
FIG. 6A illustrates an example of the measured point spread functions of the mmWave imaging system showing an icosahedron used to emulate a point target.
Figure 6B:
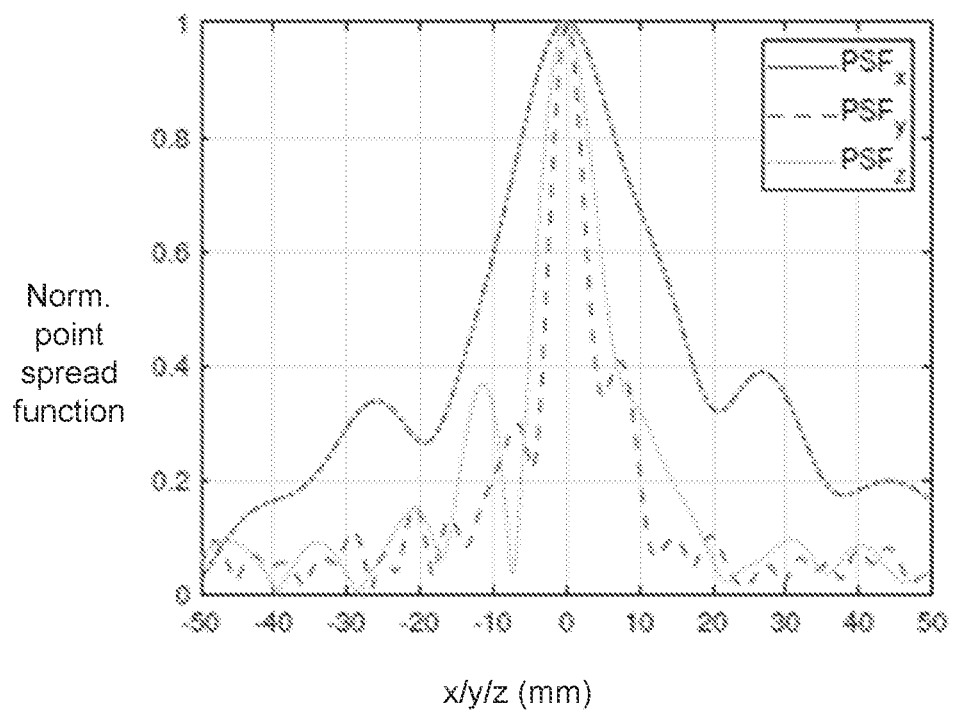
FIG. 6B illustrates an example graph of the measured point spread functions of the mmWave imaging system showing the resulting point spread functions for the single-sided case in x, y, and z axes.
Figure 6C:
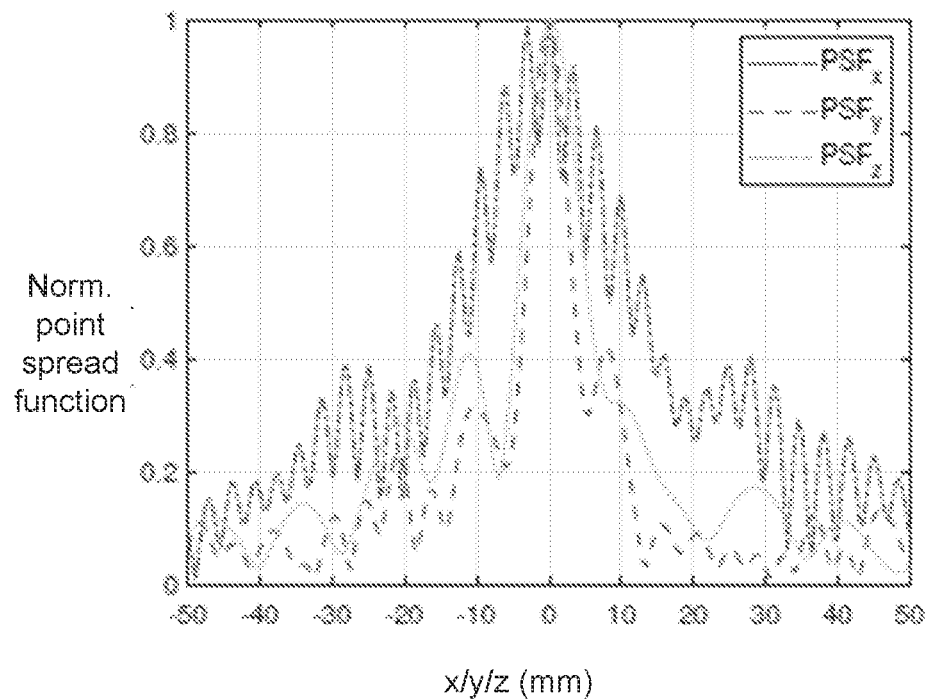
FIG. 6C illustrates an example graph of the measured point spread functions of the mmWave imaging system showing the resulting point spread functions for the uncorrected two-sided case in x, y, and z axes.
Figure 6D:
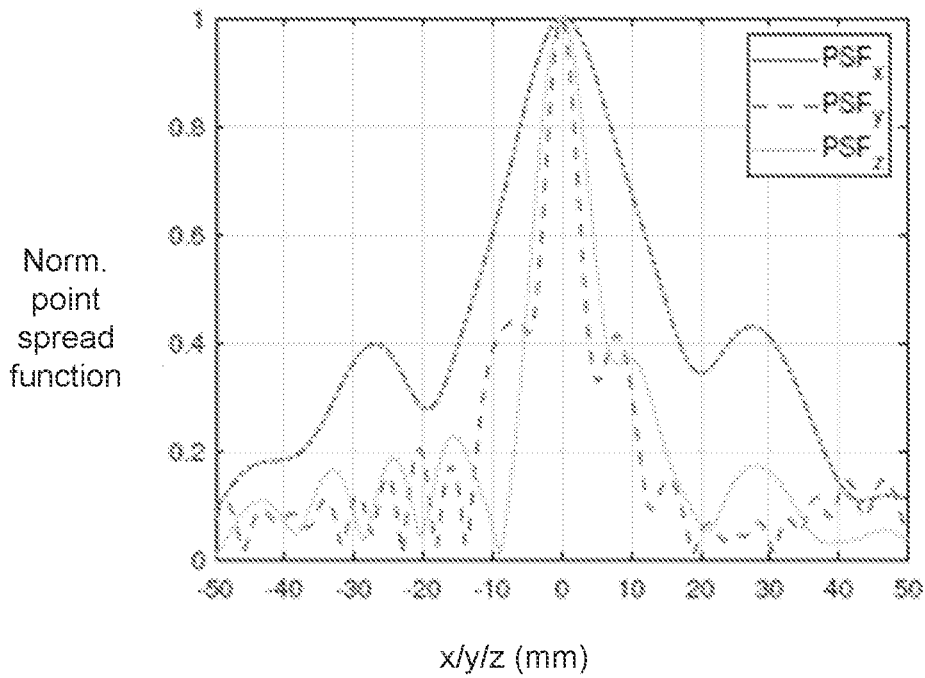
FIG. 6D illustrates an example graph of the measured point spread functions of the mmWave imaging system showing the resulting point spread functions for the corrected two-sided case in x, y, and z axes.

FIG. 6A illustrates example of the measured point spread functions of the mmWave imaging system showing the icosahedron used to emulate a point target. FIG. 6B illustrates an example graph of the measured point spread functions of the mmWave imaging system showing the resulting point spread functions for the single-sided case in x, y, and z axes. FIG. 6C illustrates an example graph of the measured point spread functions of the mmWave imaging system showing the resulting point spread functions for the uncorrected two-sided case in x, y, and z axes. FIG. 6D illustrates an example graph of the measured point spread functions of the mmWave imaging system showing the resulting point spread functions for the corrected two-sided case in x, y, and z axes. To experimentally verify the point spread function (PSF) and the achievable resolution of the system, a 3D printed first-order icosahedron, coated in metallic paint, was used as a omni-directional corner reflector at x=0.6 m to approximate a point scatterer having an increased radar cross section (see FIG. 6A). The detailed PSFs in the x, y, and z dimensions for the three cases single-sided, uncorrected two-sided, and corrected two-sided are depicted in FIGS. 6B, 6C, and 6D. The irregular shape of the PSFs is most likely due to image noise (including multiple scattering) as the back-scattered signal from the icosahedron is close to the noise floor. However, it can be clearly seen that the two-sided PSF in the x-dimension is distorted by a wavelength dependent beat pattern with a period of 3 mm. FIG. 6D shows the PSFs of the corrected two-sided image, where the wavelength dependent beat pattern is successfully mitigated. From these plots, the system resolution can be obtained. The system resolution is defined by the full width at half maximum (FWHM, 3-dB width) of the PSFs. The measured system resolutions are listed in Table 2. As can be seen, the range resolution δx is smallest in the single-sided case (16.81 mm) and increased by 13.8% in the two-sided case (19.13 mm) and by 1.5% in the image beat pattern corrected two-sided case (17.07 mm). The cross-range resolution δy is smallest in the single-sided case (4.32 mm), increased by 14.1% in the two-sided case (4.93 mm) and by 6.9% in the image beat pattern corrected two-sided case (4.62 mm). However, the cross-range resolution δz is smallest in the uncorrected two-sided case (7.17 mm). This is an improvement of 1.3% over both the single-sided case (7.26 mm) and the corrected two-sided case (7.26 mm). Generally, the measurements confirm the shown simulation example in FIGS. 3A, 3B, and 3C which suggests that all, δx, δy, and δz are expected to be similar between the three different systems. Any differences are due to image noise.

TABLE 2

Point Spread Function Measurements

| Imaging Type | δx (mm) | δy (mm) | δz (mm) |
|---|---|---|---|
| single-sided | 16.81 | 4.32 | 7.26 |
| uncorrected two-aided | 19.13 | 4.93 | 7.17 |
| corrected two-sided | 17.07 | 4.62 | 7.26 |

TABLE 3

Test Squares Measurements

| Imaging Type | Square | H (mm) | V (mm) |
|---|---|---|---|
| single-sided | 40 × 40 | 42 | 42 |
|  | 30 × 30 | 32 | 32 |
|  | 25 × 25 | 28 | 26 |
|  | 20 × 20 | 25 | 23 |
|  | 15 × 15 | 19 | 16 |
| uncorrected two-sided | 40 × 40 | 42 | 41 |
|  | 30 × 30 | 33 | 32 |
|  | 25 × 25 | 29 | 25 |
|  | 20 × 20 | 25 | 22 |
|  | 15 × 15 | 18 | 16 |
| corrected two-sided | 10 × 40 | 41 | 41 |
|  | 30 × 30 | 32 | 32 |
|  | 25 × 25 | 27 | 26 |
|  | 20 × 20 | 23 | 22 |
|  | 15 × 15 | 18 | 15 |

Figure 7A:
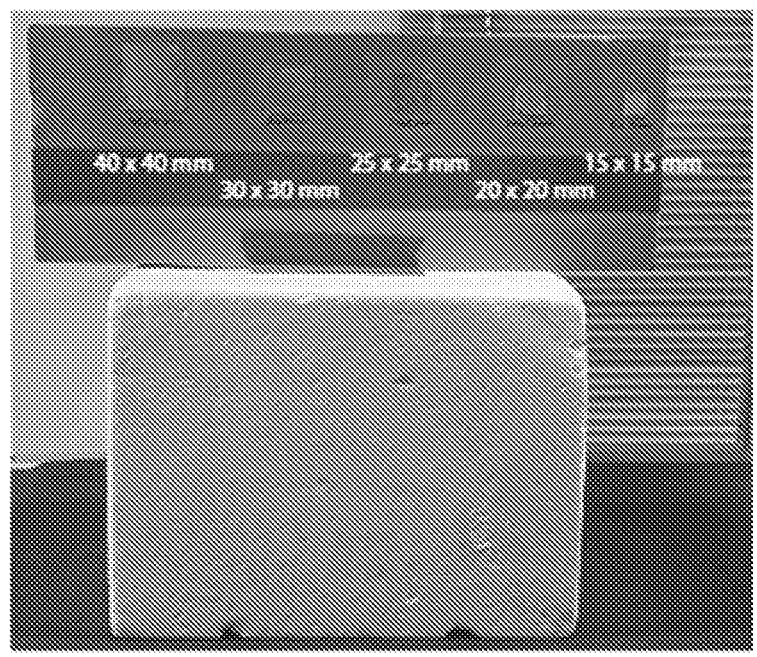
FIG. 7A illustrates an example of a measured image accuracy test pattern showing a test target consisting of 5 squares of various sizes made out of metal tape.
Figures 1, 7B:
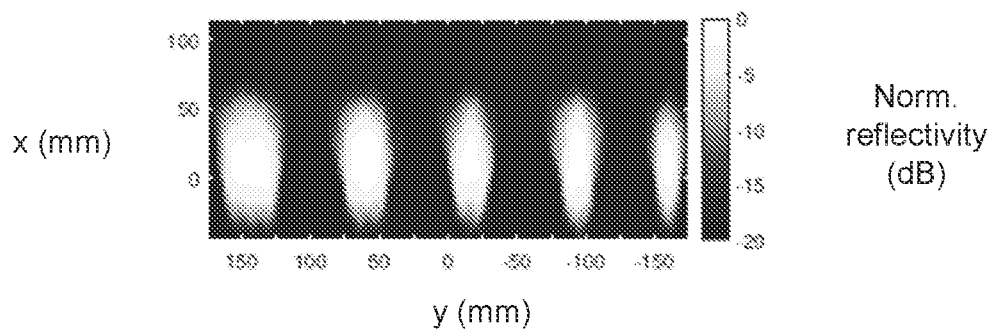
Figures 2, 7B:
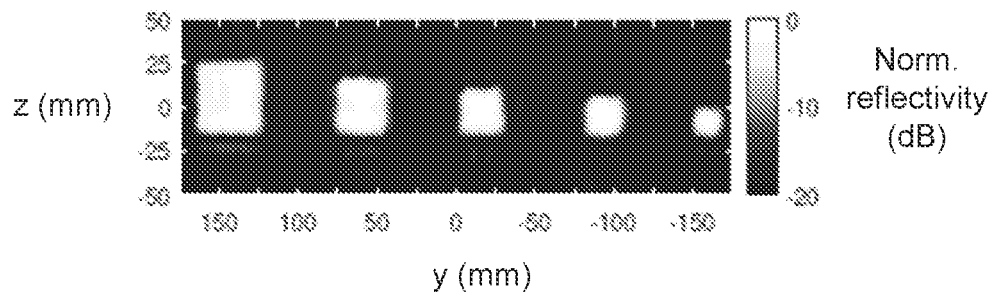
Figures 1, 7C:
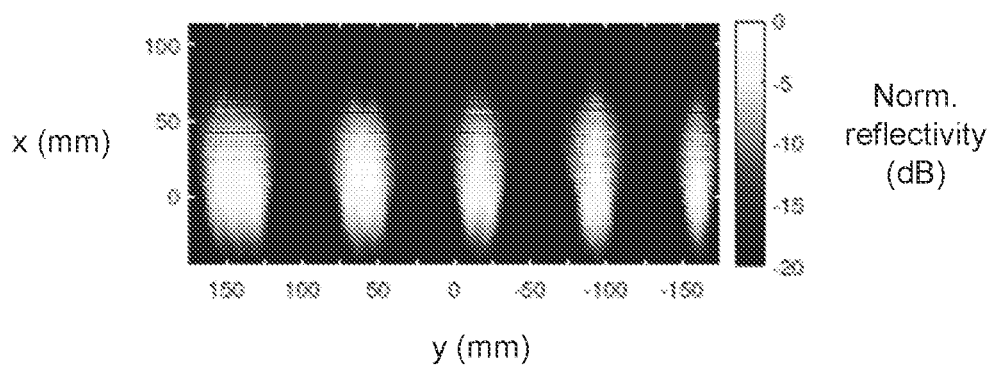
Figures 2, 7C:
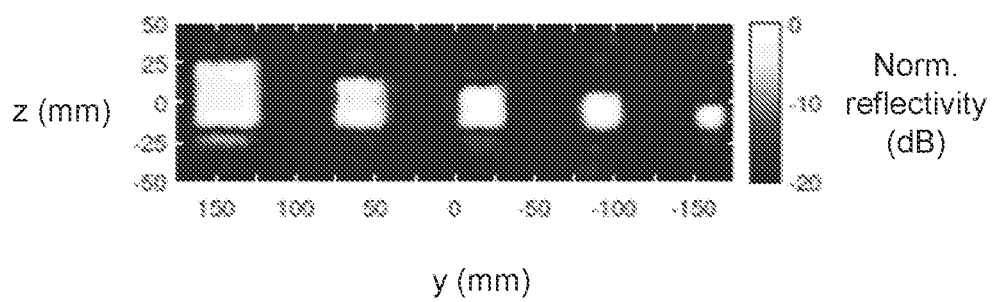
Figures 1, 7D:
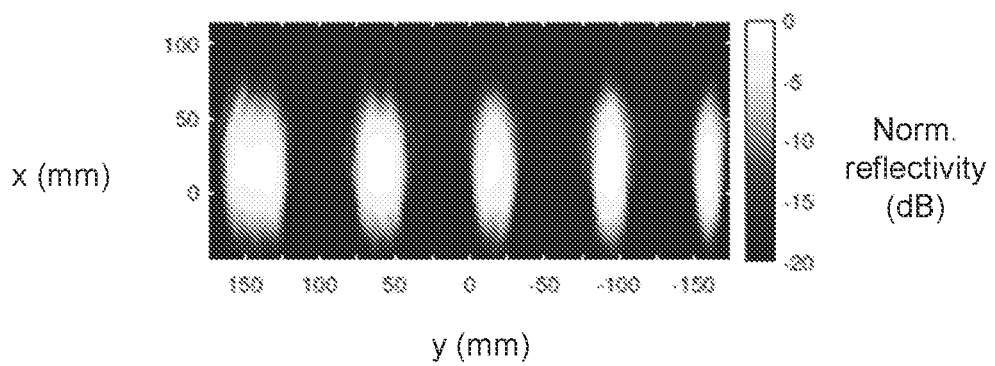
Figures 2, 7D:
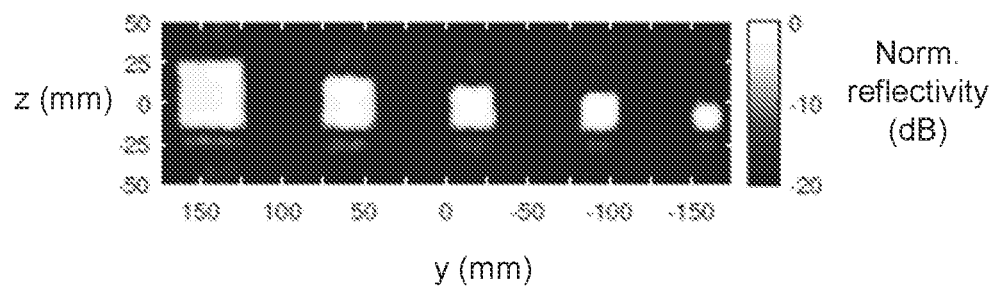

FIG. 7A illustrates an example of a measured image accuracy test pattern showing the used test target consisting of 5 squares of various sizes made out of metal tape. FIG. 7B-1 illustrates an example scene of a measure image accuracy test pattern showing a 2-D slice at a fixed height z of the 3-D reconstruction at the height of the target. FIG. 7B-2 illustrates an example scene of a measure image accuracy test pattern showing a 2-D slice at a fixed depth x of the 3D reconstruction at the depth of the target for the single-sided case. FIG. 7C-1 illustrates an example scene of a measure image accuracy test pattern showing a 2-D slice at a fixed height z of the 3-D reconstruction at the height of the target. FIG. 7C-2 illustrates an example scene of a measure image accuracy test pattern showing a 2-D slice at a fixed depth x of the 3D reconstruction at the depth of the target for the uncorrected two-sided case. FIG. 7D-1 illustrates an example scene of a measure image accuracy test pattern showing a 2-D slice at a fixed height z of the 3-D reconstruction at the height of the target. FIG. 7D-2 illustrates an example scene of a measure image accuracy test pattern showing a 2-D slice at a fixed depth x of the 3D reconstruction at the depth of the target for the corrected two-sided case.

To verify the accuracy of the imaging system, a measurement of a set of test squares made out of metal tape (see FIG. 7A) was imaged. FIGS. 7B-1, 7B-2, 7C-1, 7C-2, 7D-1, and 7D-2 depict the resulting mmWave images for the single-sided, two-sided, and image beat pattern corrected two-sided case. All squares can appear thicker in x than the actual thickness of the metal tape (less than 1 mm). This is due to the range resolution of $\delta x > 0$. However, all squares show the same behavior in this respect. The measured size and actual size of these test squares is listed in Table 3 for their respective horizontal (H) y and vertical (V) z dimensions. The size was measured at the local −10 dB threshold of each square. The offset in the y direction shows a standard deviation of 1.3 mm for the single-sided case, 1.1 mm in the uncorrected two-sided case, and 0.8 mm for the corrected two-sided case. The offset in the z direction shows a standard deviation of 0.8 mm for all three cases. Note, that when comparing FIGS. 7C-1 and 7C-2, with 7D-1 and 7D-2. The effect of the mitigation of the wavelength dependent image beat pattern is apparent.

Figure 8A:
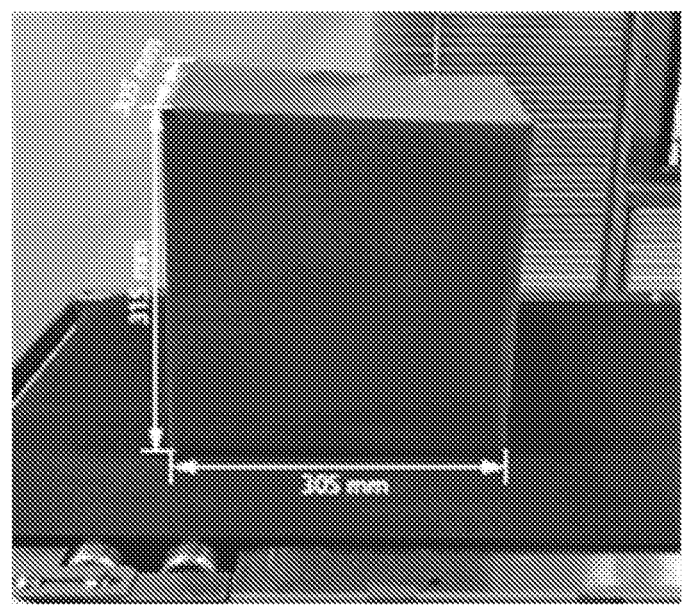
FIG. 8A illustrates an example of measured packaged goods with a shipping box.
Figure 8B:
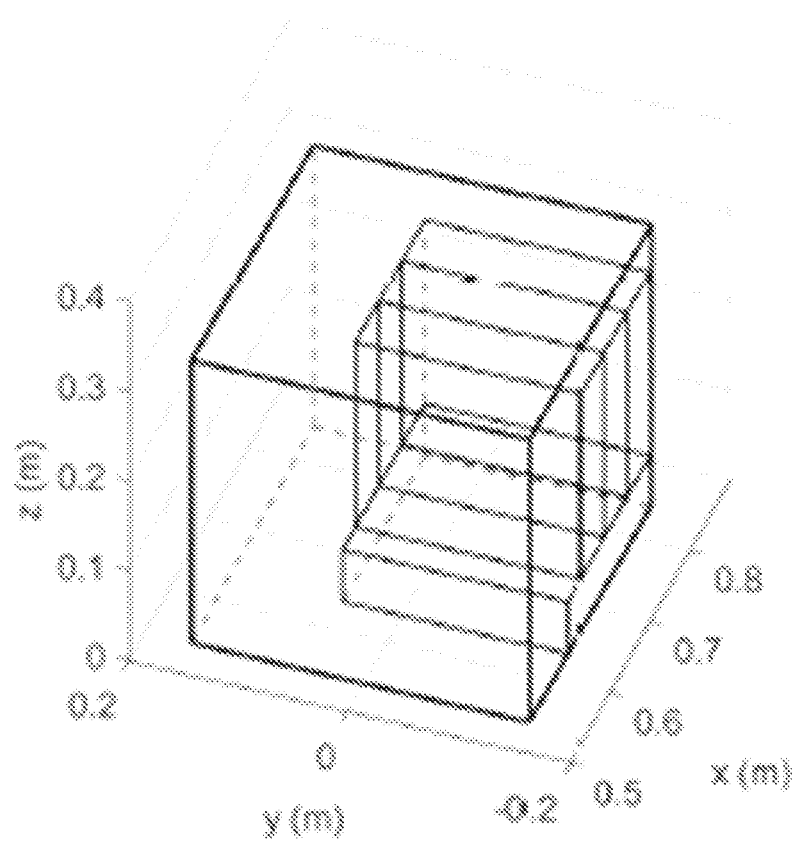
FIG. 8B illustrates an example of measured packaged goods with a shipping box packed with four cardboard boxes of 15 ft (406 m) HDMI stacked cables.
Figure 8C:
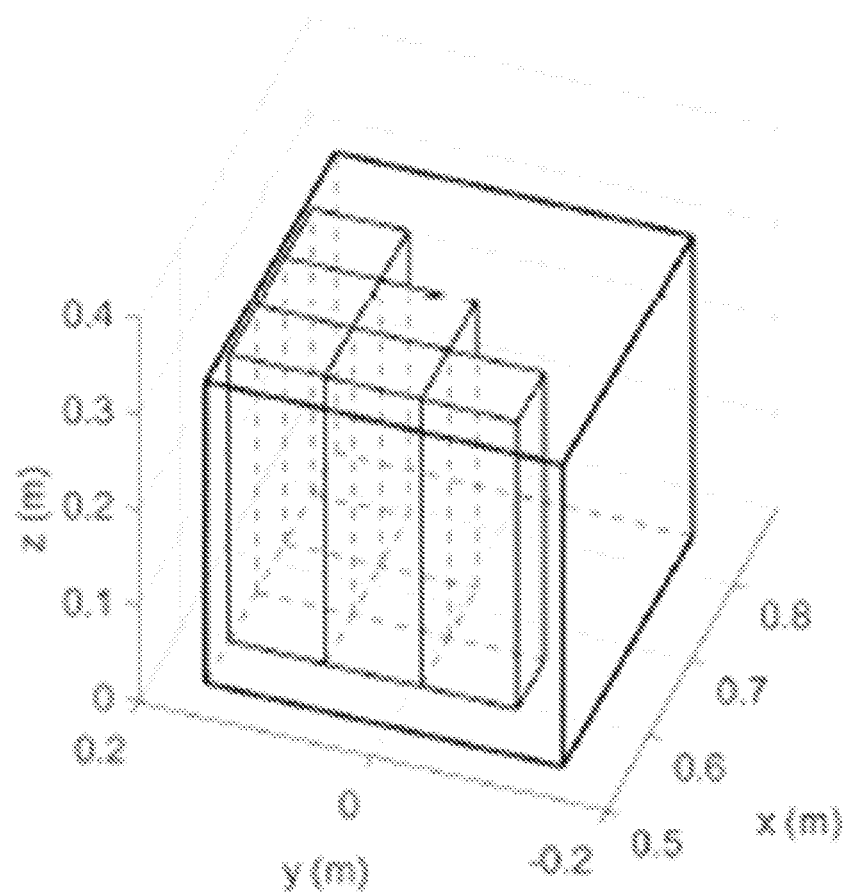
FIG. 8C illustrates an example of measured packaged goods with a shipping box with six bottles stacked.

FIGS. 8A, 8B, and 8C illustrate packaged goods examples. FIG. 8A illustrates an example of measured packaged goods with a shipping box. FIG. 8B illustrates an example of measured packaged goods with a shipping box packed with four cardboard boxes of 15 ft (406 m) HDMI stacked cables. FIG. 8C illustrates an example of measured packaged goods with a shipping box with six bottles stacked. The first example object consists of a 305×305×315 mm (width×depth×height) corrugated cardboard shipping box (see FIG. 8A) containing four 15 ft (4.6 m) general purpose high-speed HDMI cables, each packaged separately in individual cardboard boxes. One HDMI cable lay horizontally on the bottom of the shipping box, towards the back. The three other HDMI cables were positioned vertically on top of the first HDMI cable, positioned three deep towards the back of the shipping box. The orientation of the boxes of HDMI cables is shown in FIG. 8B.

Figure 9A:
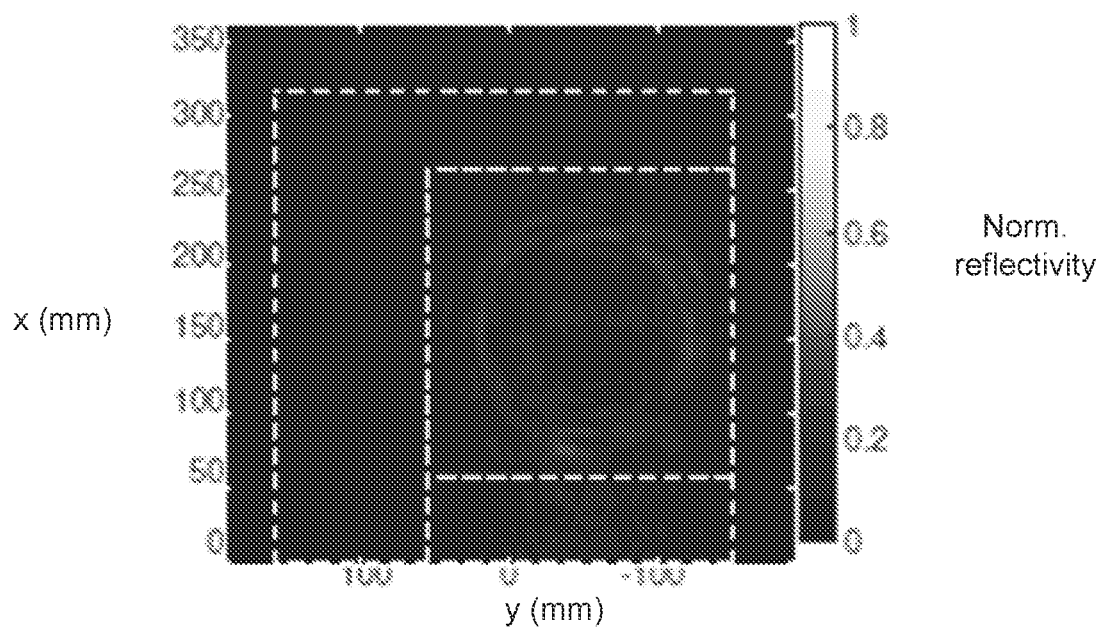
FIGS. 9A, 9B, and 9C illustrate example scenes showing slices in the (y/z) plane of an HDMI cable placed in the front of the shipping box at depth x=0:675 m.
Figure 9B:
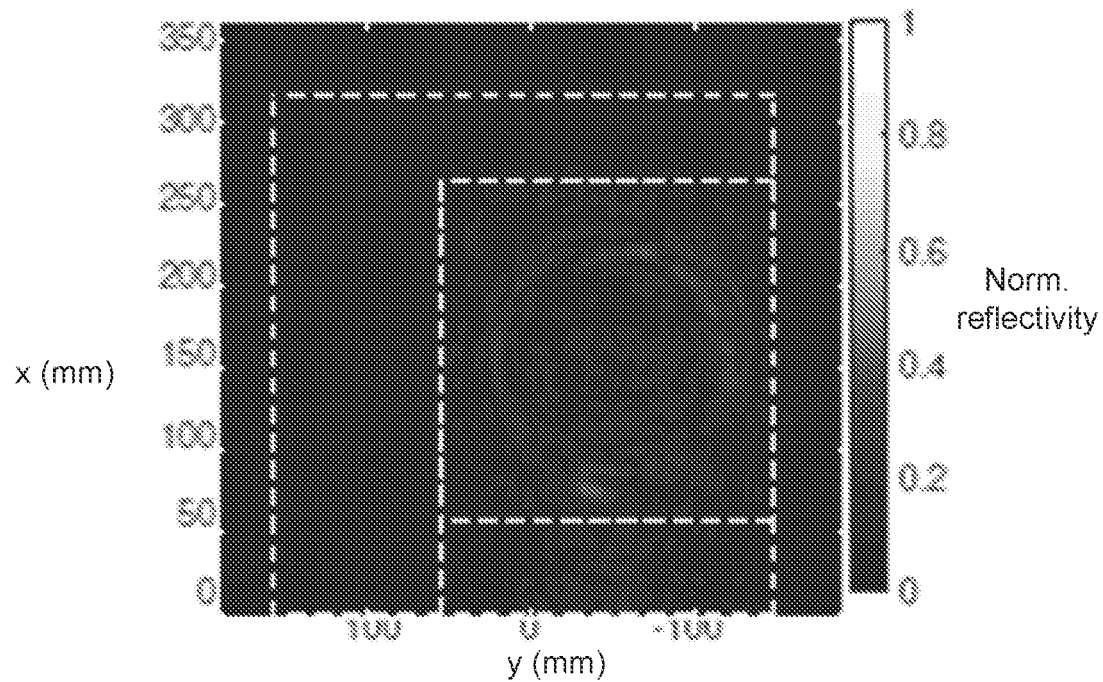
Figure 9C:
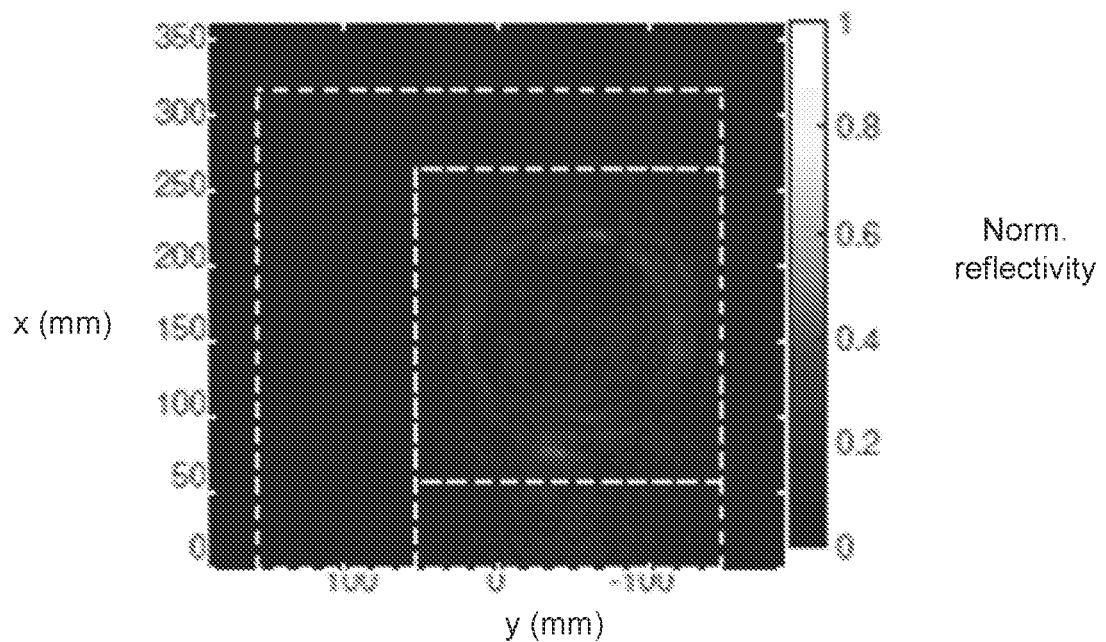
Figure 9D:
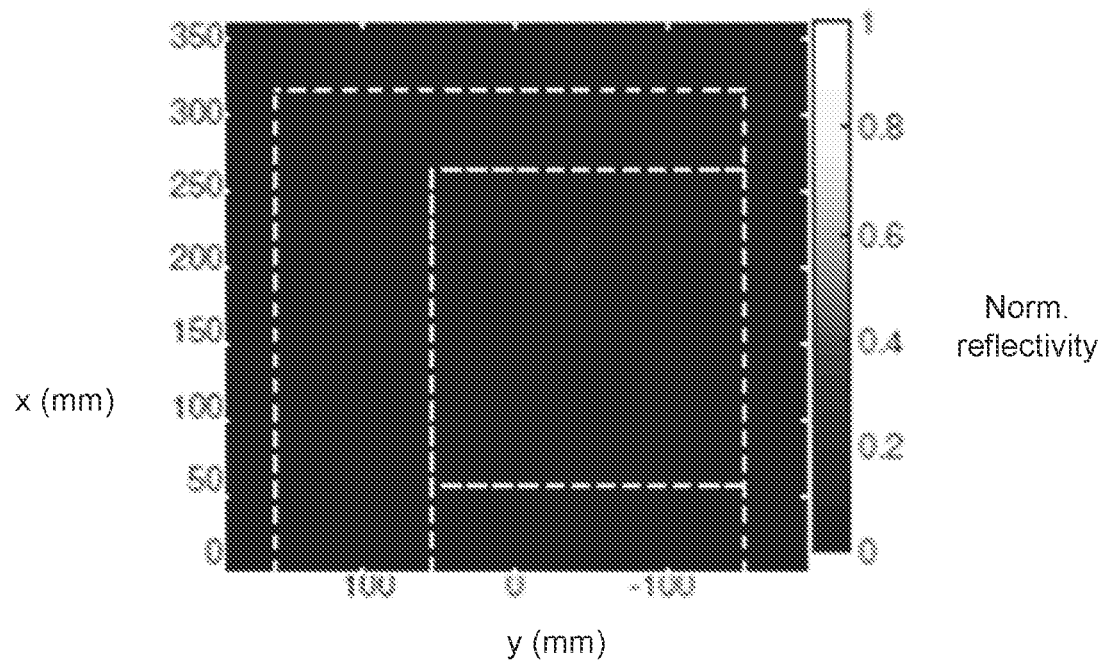
FIGS. 9D, 9E, and 9F illustrate example scenes showing slices in the (y/z) plane of a HDMI cables placed in the back of the shipping box at depth x=0:843 m.
Figure 9E:
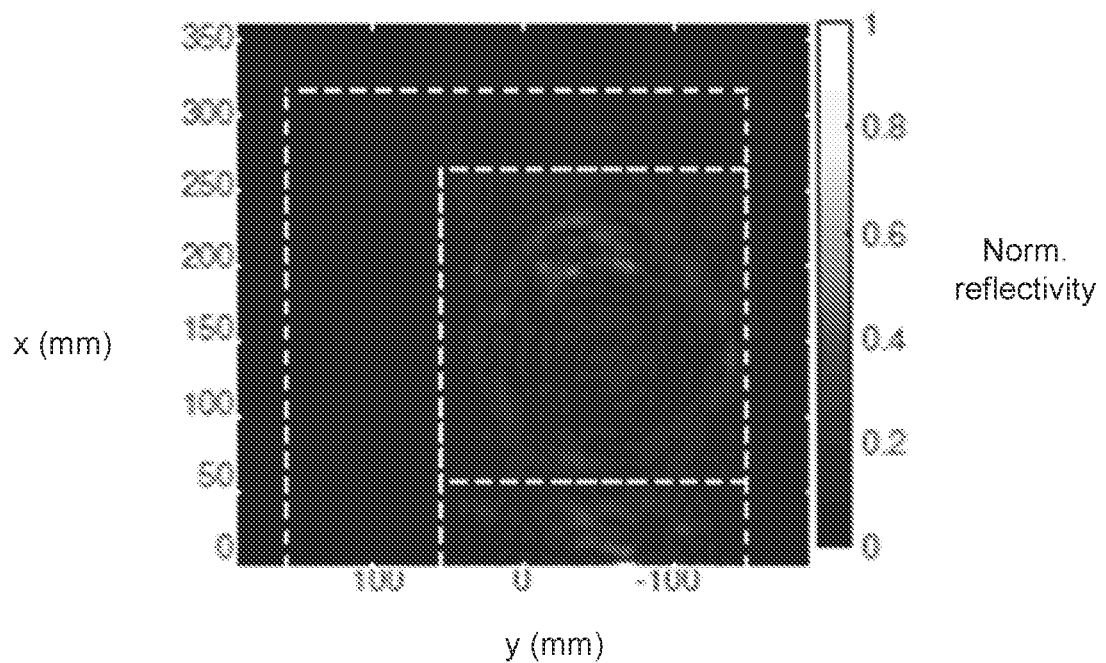
Figure 9F:
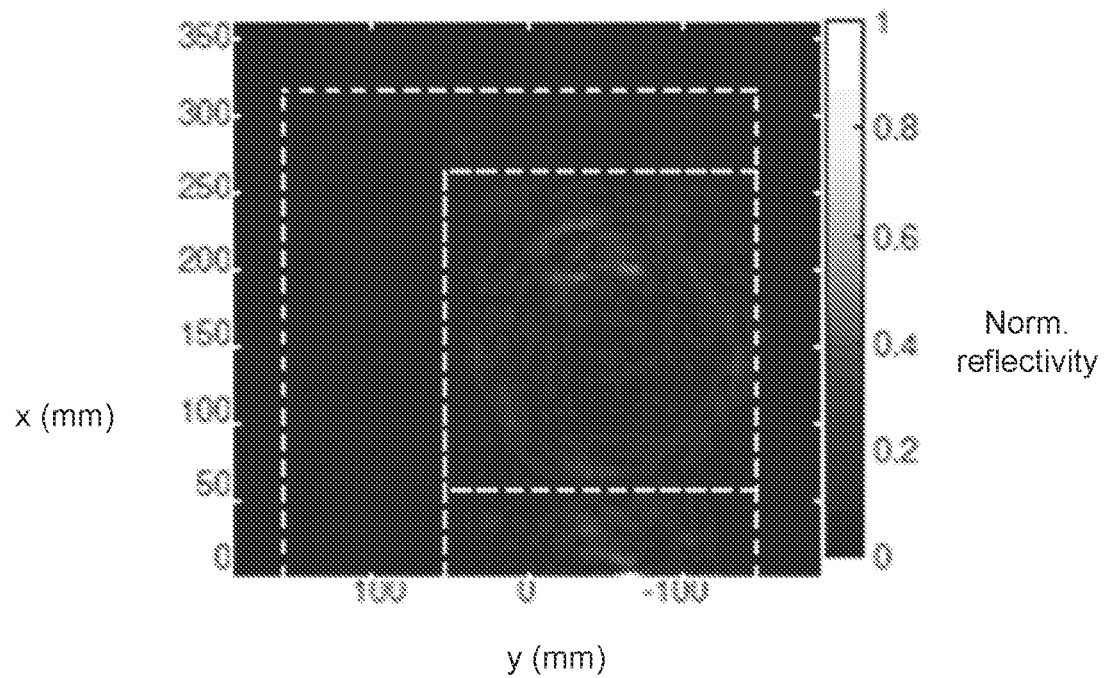
Figure 9G:
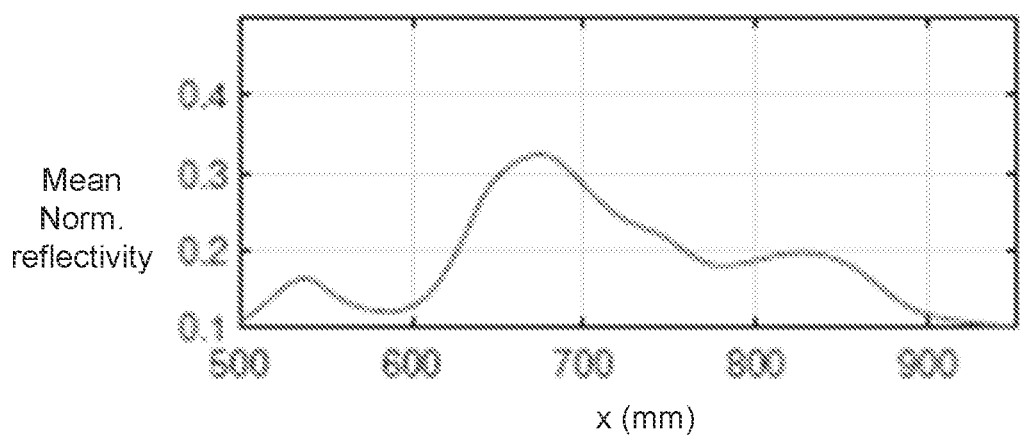
FIGS. 9G, 9H, and 9I illustrate example graphs depicting mean normalized reflectivity for the scene shown in FIGS. 9A, 9B, 9C in the (y/z) plane along x plane.
Figure 9H:
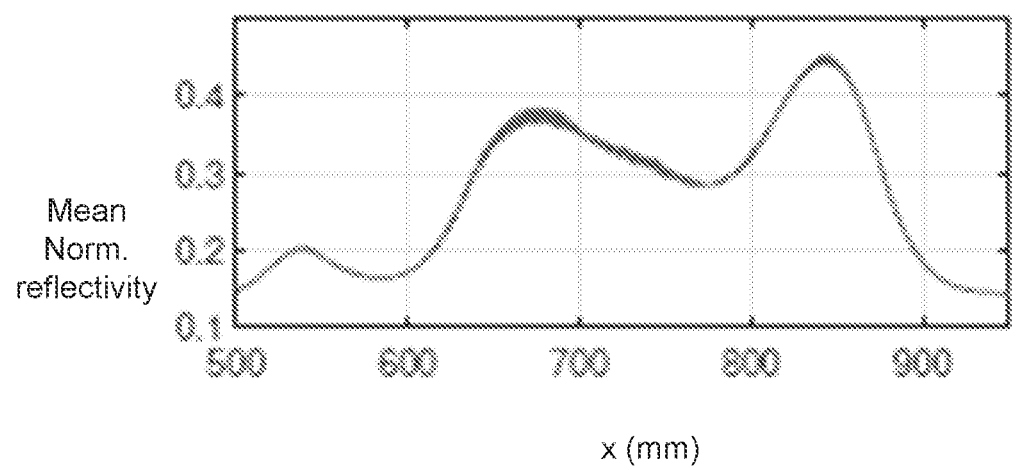
Figure 9I:
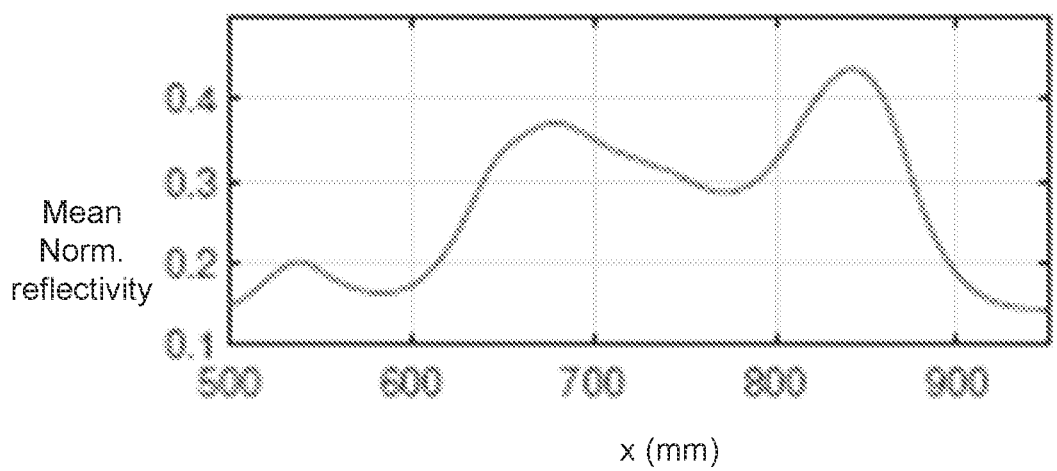

FIGS. 9A-9I show reconstructed images of a packaged goods example, such as HDMI cables in a corrugated shipping box. FIGS. 9A, 9D, and 9G show images of the single-sided case, FIGS. 9B, 9E, and 9H show the uncorrected two-sided case, and FIGS. 9C, 9F, and 9I show the corrected two-sided case. FIGS. 9A, 9B, and 9C show slices in the (y/z) plane at x=0.675 m depicting the HDMI cable placed in the front of the shipping box, while FIGS. 9D, 9E, and 9F show slices in the (y/z) plane at x=0.843 m depicting the HDMI cable placed in the back of the shipping box. Note that in all the cases the HDMI cable placed in the front of the shipping box is well rendered. However, only the two-sided cases shows significant energy reflected from the HDMI cable in the back. FIGS. 9G, 9H, and 9I show the mean normalized reflectively in the (y/z) plane along x. Note the image beat pattern shown in FIG. 9H and its correction in FIG. 9I. Also note that FIG. 9G only shows an area of strong reflectively around x=0.675 m which is due to the HDMI cable in the front while FIG. 9H and FIG. 9I also show a second area of strong reflectivity around x=0.843 m, which is due to the HDMI cable in the back.

Figure 10A:
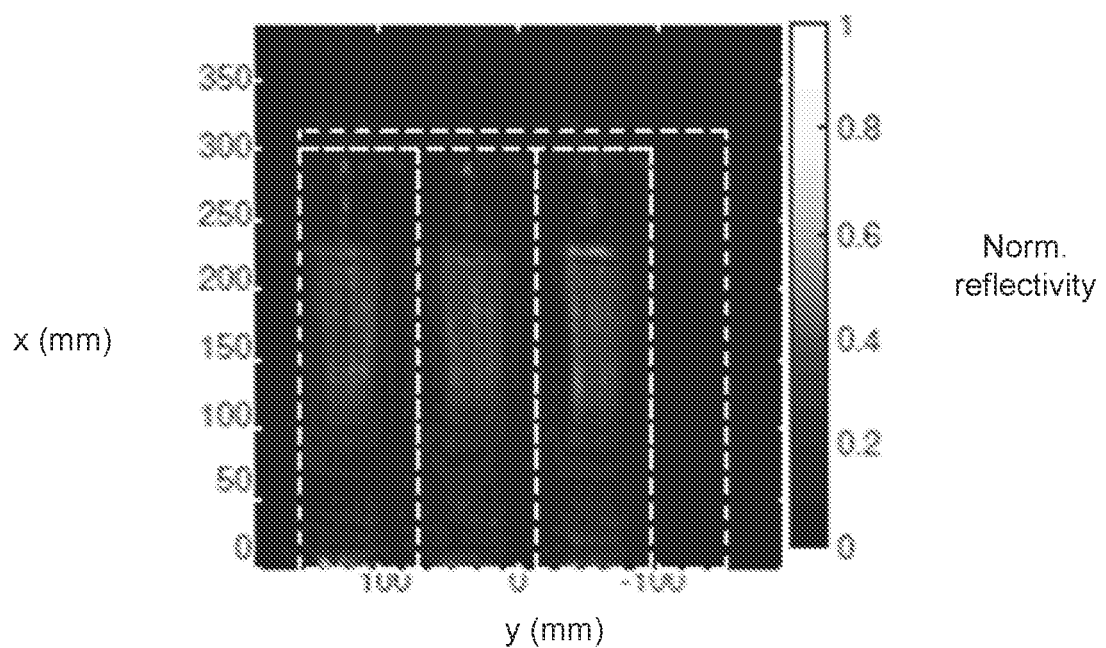
FIGS. 10A, 10B, and 10C illustrate example scenes showing slices in the (y/z) plane of three shampoo bottles placed in the front of the shipping box at depth x=0:614 m.
Figure 10B:
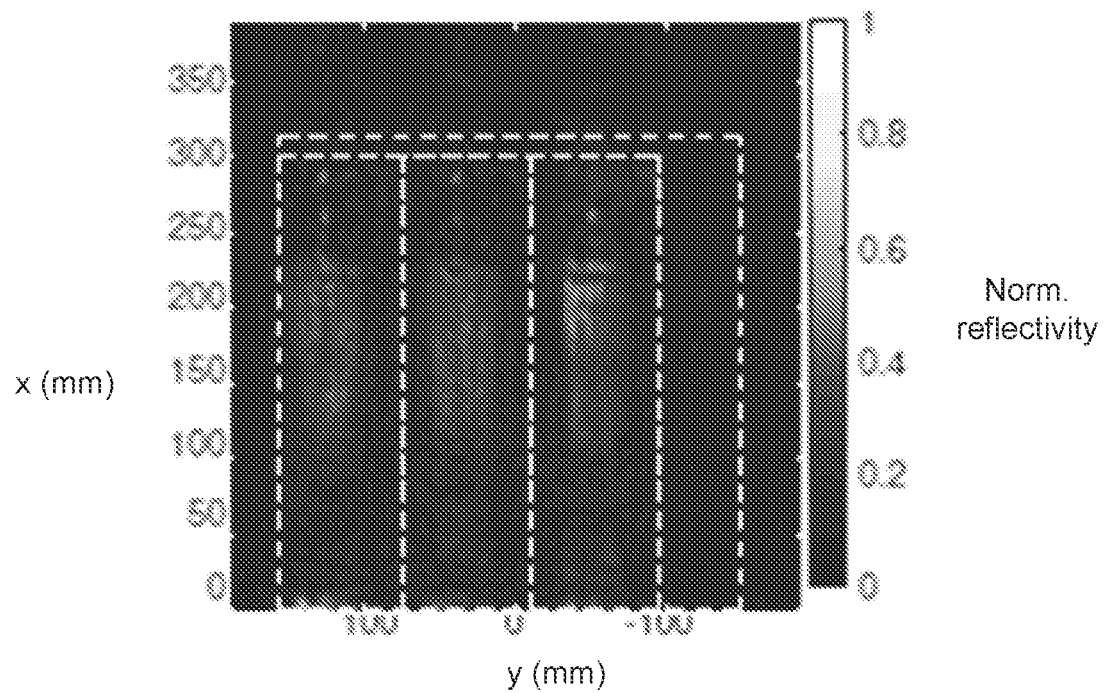
Figure 10C:
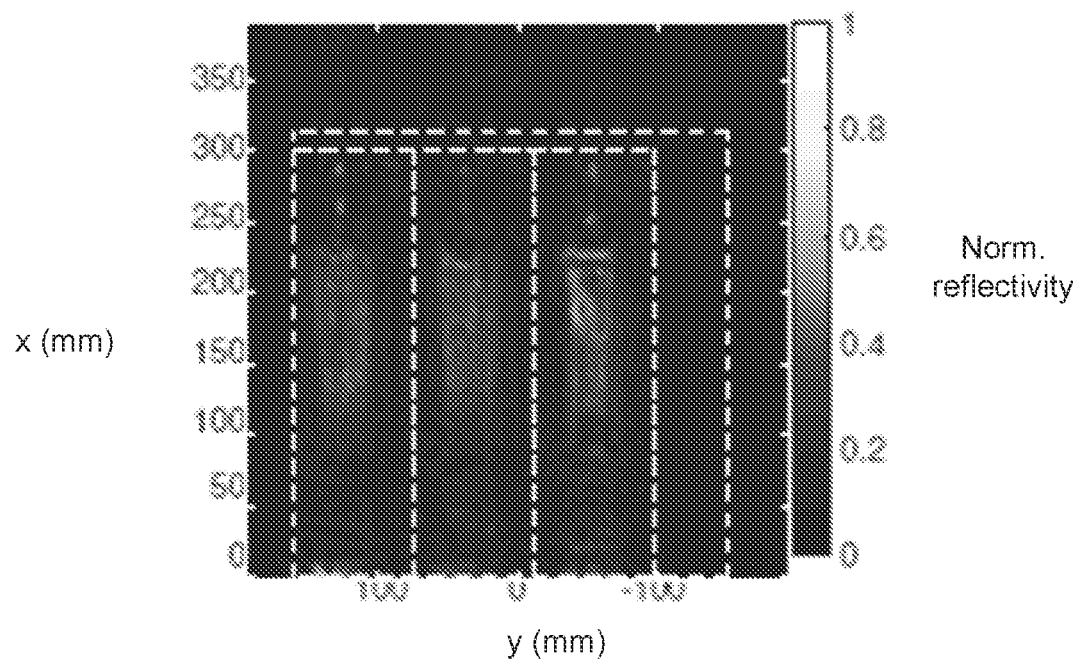
Figure 10D:
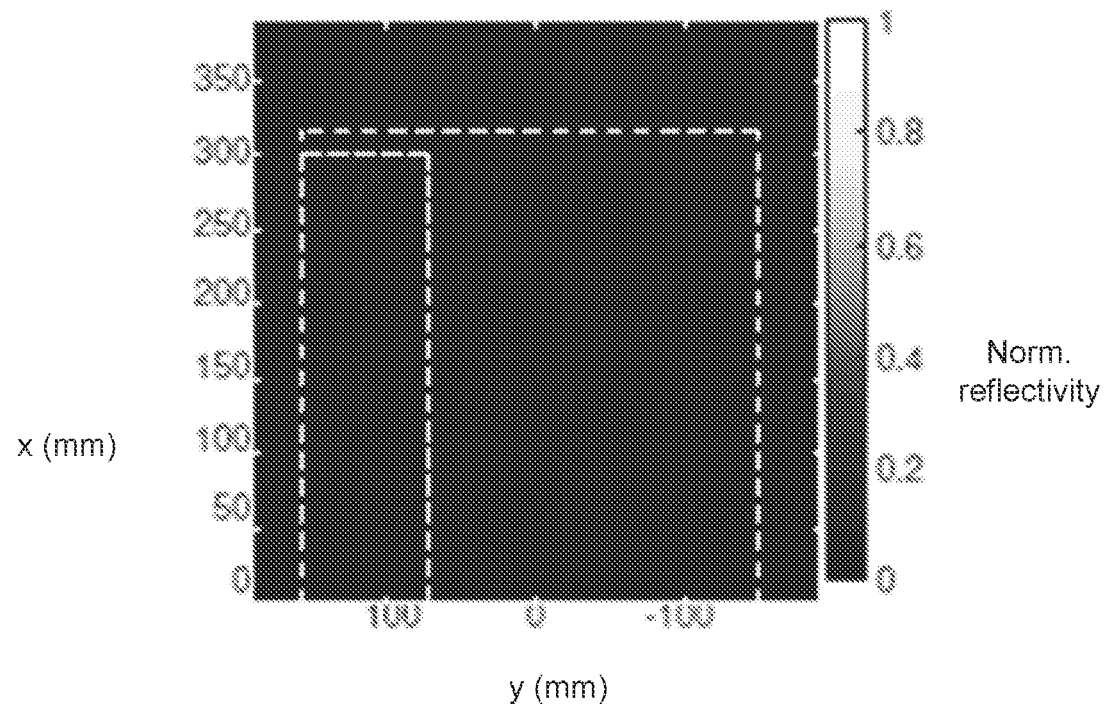
FIGS. 10D, 10E, and 10F illustrate example scenes showing slices in the (y/z) plane of a single shampoo bottle placed in the back of the shipping box at depth x=0:787 m.
Figure 10E:
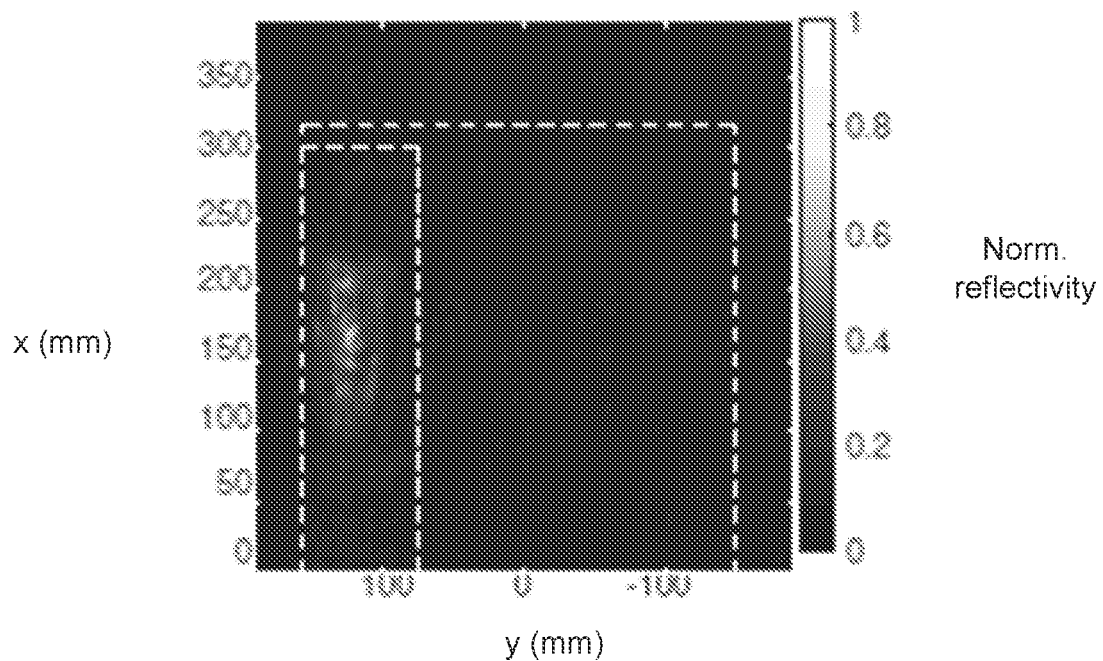
Figure 10F:
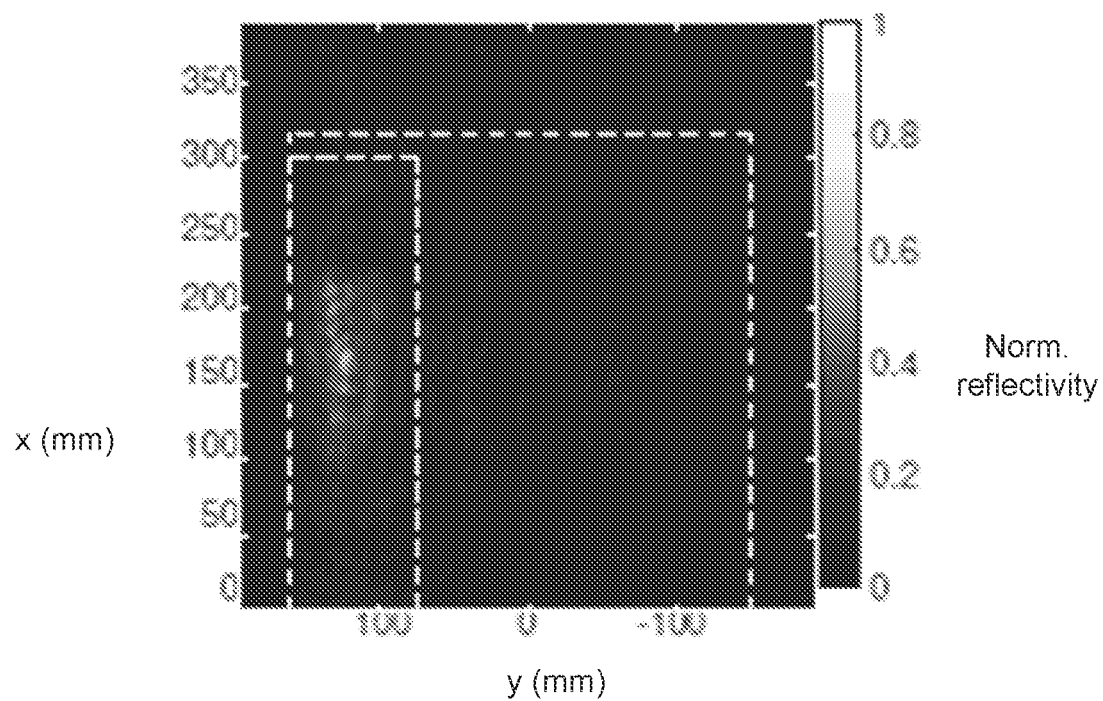
Figure 10G:
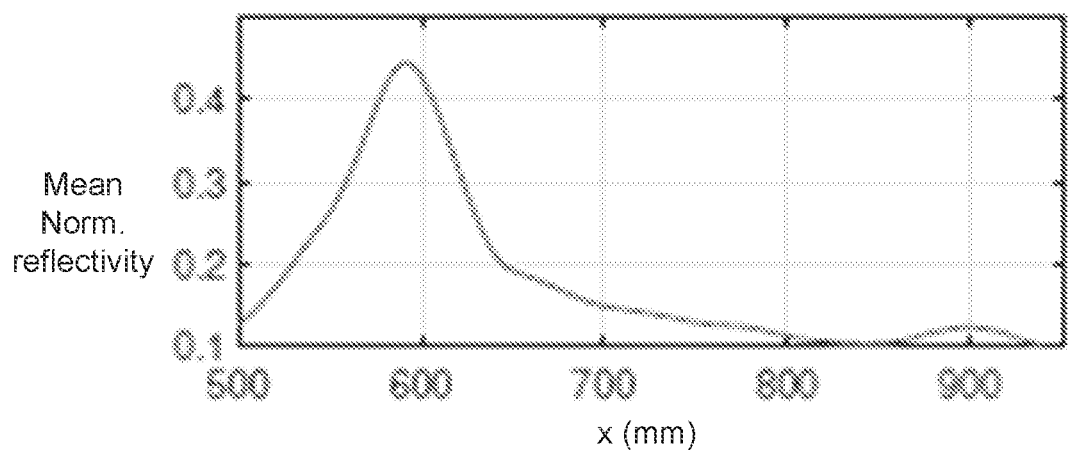
FIGS. 10G, 10H, and 10I illustrate example graphs depicting mean normalized reflectivity for the scene shown in FIGS. 10A, 10B, 10C in the (x/y) plane along x plane.
Figure 10H:
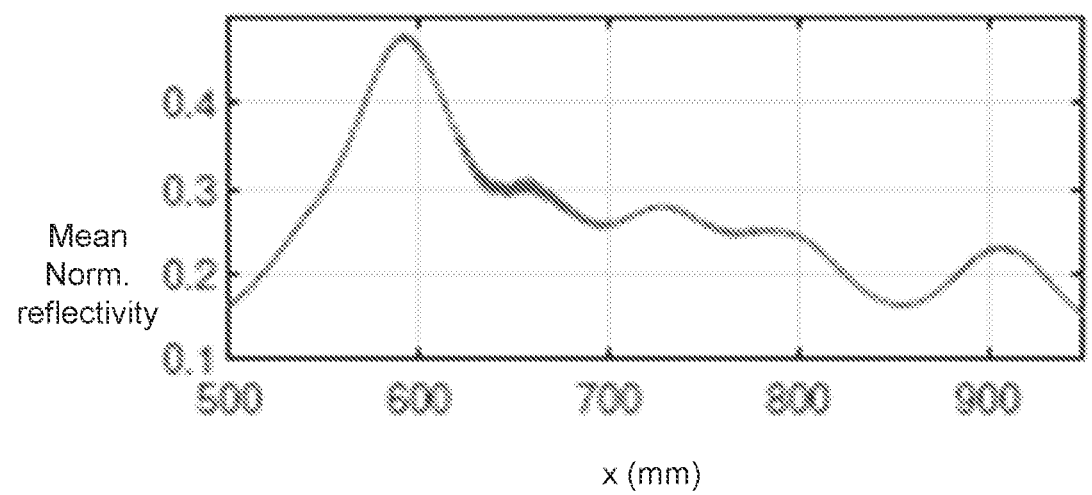
Figure 10I:
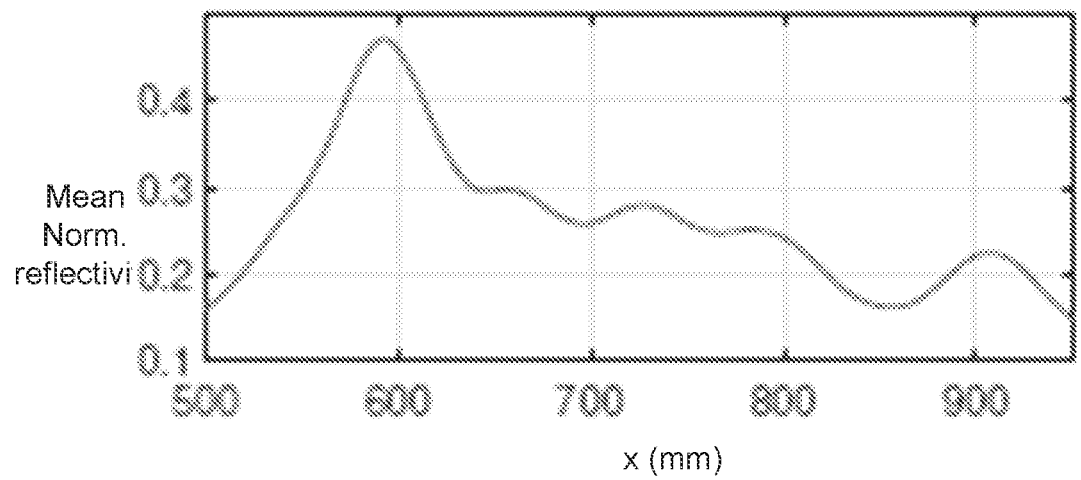

FIGS. 10A, 10B, and 10C illustrate example scenes showing slices in the (y/z) plane of three shampoo bottles placed in the front of the shipping box at depth x=0:614 m. FIGS. 10D, 10E, and 10F illustrate example scenes showing slices in the (y/z) plane of a single shampoo bottle placed in the back of the shipping box at depth x=0:787 m. FIGS. 10G, 10H, and 10I illustrate example graphs depicting mean normalized reflectivity in the (x/y) plane along x. The second example object consists of a 305×305×315 mm (width×depth×height) corrugated cardboard shipping box (see FIG. 10A) containing six bottles filled with shampoo. The bottles are standing upright, with three bottles in the first row in the front of the box, two bottles in the second row, and one bottle in the last row, farthest from imaging array #1. The shampoo bottle orientation in the shipping box is shown in FIG. 10C. FIGS. 10A, 10D, and 10G show images of the single-sided case, FIGS. 10B, 10E, and 10H show the uncorrected two-sided case, and FIGS. 10C, 10F, and 10I show the corrected two-sided case. FIGS. 10A, 10B, and 10C show slices in the (y/z) plane at x=0.614 m depicting the first row of shampoo bottles placed in the front of the shipping box, while the FIGS. 10D, 10E, and 10F show slices in the (y/z) plane at x=0.787 m depicting the shampoo bottle placed in the back of the shipping box. Similar as in the aforementioned HDMI cable example, in all the cases the shampoo bottles placed in the front of the shipping box are well rendered. Again, only the two-sided cases show significant energy reflected of the shampoo bottle in the back. FIGS. 10G, 10H, and 10I show the mean normalized reflectively in the (y/z) plane along x. Note the image beat pattern shown in FIG. 10H and its correction in FIG. 10I. Also note that FIG. 10G only shows an area of strong reflectively around x=0.614 m which is due to the shampoo bottles in the front while FIG. 10H and FIG. 10I also show a second area of strong reflectively around x=0.787 m which is due to the shampoo bottle in the back of the box, occluded from imaging array #1 by the front bottles.

In these examples, it can be seen that the images of the two two-sided cases depict more scene information for larger x values than the single-sided case. The reason is that objects closest to the single-sided imaging array occlude objects in the back. However, in two-sided imaging approaches the second imaging array is able to fill in the missing voxels of the back side to get a better representation of the full cardboard shipping box, including its content.

A method to mitigate wavelength dependent image beat pattern for two-sided, reflection-based 3-D mmWave imaging systems is presented and experimentally verified. It has been shown that a two-sided imaging approach successfully increases the image volume when objects are occluded for single-sided imagers and that the image beat pattern correction is able to successfully mitigate this effect in the image. In addition, it was shown that the resolution of the single-sided and the two-sided imagers are similar with $\delta x=17.07$ mm, $\delta y=4.62$ mm, and $\delta z=7.26$ mm for the two-sided case. In terms of image accuracy, it was shown that the accuracy in y could be improved using two-sided imagers to a standard deviation of 0.8 mm in contrast to 1.3 mm in the single-sided case, whereas the standard deviation in z was shown to be 0.8 mm in all three cases for the given example. The presented imaging system permits automated inspection of packaged goods traveling on fast-moving (up to 3 m/s) conveyor belts throughout the whole box due to the two-sided imaging approach. The low power density of the mmWave imaging sensor permits operation in close proximity to human workers without added shielding.

The frequency response measurement $h_n(k)$ at mmWave sensor location $x_n$ is given as:

$$h_n(k) = \rho \alpha_n e^{-j2kR_n(x_0)} + v_n(k), \quad (14)$$

where j is the imaginary unit, k is the wave-number $k=\omega/c_0$, with $\omega$ being the interrogation signal angular frequency in rad/s, $c_0$ being the speed of light, $\alpha_n$ is the antenna gain and pathloss from the n-th mmWave sensor to the point target, $x_0$ is the location of the point target, $R_n(x_0)=\|x_n-x_0\|$ is the distance between the n-th mmWave sensor location to the point target, $\rho$ is the complex reflectivity of the point target, and $v_n(k)$ is measurement noise.

The single-sided image $I_{ss}(x)$ is given as:

$$I_{ss}(x) = \sum_{n=1}^{N} \int_{k_1}^{k_u} h_n(k) \cdot e^{+j2kR_n(x)} dk + \tilde{v}(x), \quad (15)$$

where $k_u$ and $k_l$ are the maximum upper and minimum lower k-space frequencies of the interrogation signal, respectively, and v'(x) is the noise in the image due to measurement noise.

Substituting equation 14 into equation 15 and rearranging leads to:

$$I_{ss}(x) = \sum_{n=1}^{N} \int_{k_1}^{k_u} \rho \alpha_n e^{-j2kR_n(x_0)} \cdot e^{+j2kR_n(x)} dk + \tilde{v}(x) \quad (16)$$

$$= j\rho \sum_{n=1}^{N} \alpha_n \left[ \frac{e^{-j2k_u[R_n(x_0)-R_n(x)]}}{2[R_n(x_0)-R_n(x)]} - \frac{e^{-j2k_1[R_n(x_0)-R_n(x)]}}{2[R_n(x_0)-R_n(x)]} \right] + \tilde{v}(x) \quad (17)$$

$$= j\rho \sum_{n=1}^{N} \alpha_n \quad (18)$$

$$\left[ \frac{e^{-j2\left(k_c+\frac{B_k}{2}\right)[R_n(x_0)-R_n(x)]}}{2[R_n(x_0)-R_n(x)]} - \frac{e^{-j2\left(k_c-\frac{B_k}{2}\right)[R_n(x_0)-R_n(x)]}}{2[R_n(x_0)-R_n(x)]} \right] + \tilde{v}(x)$$

$$= \rho B_k \sum_{n=1}^{N} \alpha_n \frac{\sin(B_k[R_n(x_0)-R_n(x)])}{B_k[R_n(x_0)-R_n(x)]} \times e^{-j2k_c[R_n(x_0)-R_n(x)]} + \tilde{v}(x) \quad (19)$$

$$= \rho B_k \sum_{n=1}^{N} \alpha_n \operatorname{sinc}(B_k[R_n(x_0)-R_n(x)]) \times e^{-j2k_c[R_n(x_0)-R_n(x)]} + \tilde{v}(x), \quad (20)$$

Where $$\operatorname{sinc}(x) = \frac{\sin(x)}{x},$$

$k_c$ being center k-space frequency, while $B_k=k_u-k_l$ being the k-space bandwidth.

With the first-order Taylor series expansion for the range $R_n(x)$ at $x_0$, given as:

$$R_n(x) \approx \frac{(x_0-x_n)^T}{\|(x_0-x_n)\|}(x-x_n) \quad (21)$$

$$\approx e_n^T(x-x_n), \quad (22)$$

where $(\bullet)^T$ is the transpose operator and $$e_n = \frac{x_0-x_n}{\|x_0-x_n\|}$$

is the unit vector pointing from $x_n$ to $x_0$, the image $I(x)$ can be approximated as:

$$I(x) = \rho B_k \sum_{n=1}^{N} \alpha_n \operatorname{sinc}(B_k[e_n^T(x_0-x)]) \times e^{-j2k_c[e_n^T(x_0-x)]} + \tilde{v}(x). \quad (23)$$

The image $I_{ts}(x)$ of a two-sided imaging system is given as the coherent combination of the individual images, $I_1(x)$ and $I_2(x)$, of the two sub-systems, thus, $$I_{ts}(x) = I_1(x) + I_2(x), \quad (24)$$

with $$I_1(x) \approx \rho B_k \sum_{n=1}^{N} \alpha_n \operatorname{sinc}(B_k[e_n^T(x_0-x)]) \times e^{-j2k_c[e_n^T(x_0-x)]} + \tilde{v}(x) \quad (25)$$

with $$I_2(x) \approx \rho B_k \sum_{m=1}^{M} \beta_m \operatorname{sinc}(B_k[f_m^T(x_0-x)]) \times e^{-j2k_c[f_m^T(x_0-x)]} + \tilde{v}(x), \quad (26)$$

where the second system consists of M measurement locations, {βm} denote antenna gain and path loss, and $f_m$ are the unit vectors pointing from the m-th measurement positions to x0.

Let's assume that the two-sided imaging system consists of only two mono-static mmWave sensors, facing each other at a distance D as depicted in the FIG. 1. The resulting two-sided image $I_{ts}(x)$ is then given as:

$$I_{ts}(x) \approx \rho B_k \alpha \operatorname{sinc}\left(B_k\left[e^T(x_0-x)\right]\right) \times e^{-j2k_c\left[e^T(x_0-x)\right]} + \quad (27)$$

$$\rho B_k \beta \operatorname{sinc}\left(B_k\left[f^T(x_0-x)\right]\right) \times e^{-j2k_c\left[f^T(x_0-x)\right]} + \tilde{v}(x)$$

$$\approx \quad (28)$$

$$\rho B_k \operatorname{sinc}\left(B_k\left[e^T(x_0-x)\right]\right) \times \left(\alpha e^{-j2k_c\left[e^T(x_0-x)\right]} + \beta e^{+j2k_c\left[e^T(x_0-x)\right]}\right) + \tilde{v}(x),$$

due to $f=-e=-[1,0,0]^T$ and $\operatorname{sinc}(-x)=\operatorname{sinc}(x)$. Substituting the identities $$\gamma = \alpha + \Delta\gamma = \beta - \Delta\gamma, \Delta\gamma = \frac{\beta-\alpha}{2}$$

results to:

$$I_{ts}(x) = \beta B_k \operatorname{sinc}(B_k[e^T(x_0-x)]) \times ((\gamma-\Delta\gamma)e^{-j2k_c[e^T(x_0-x)]} + (\gamma+\Delta\gamma)e^{+j2k_c[e^T(x_0-x)]}) + \tilde{v}(x). \quad (29)$$

After rearranging and the use of Euler's formula, the final result is given as:

$$I_{ts}(x) \approx 2\rho\gamma B_k \operatorname{sinc}\left(B_k\left[e^T(x_0-x)\right]\right) \times \left[\cos\left(2k_c\left[e^T(x_0-x)\right]\right) + \quad (30)\right.$$

$$\left. j\frac{\Delta\gamma}{\gamma}\sin\left(2k_c\left[e^T(x_0-x)\right]\right)\right] + \tilde{v}(x).$$

The beat pattern corrected two-sided image $I_{cts}(x)$ is given as:

$$I_{cts}(x) = (1+j)I_1(x) + (1-j)I_2^*(x), \quad (31)$$

where the $(\cdot)^*$ operator denotes the complex-conjugate operator. Substituting equations (25) and (26) into (31), gives:

$$I_{cts}(x) \approx (1+j)\rho B_k\alpha \operatorname{sinc} c\left(B_k\left[e^T(x_0-x)\right]\right) \times e^{-j2k_c\left[e^T(x_0-x)\right]} + \quad (32)$$

$$(1+j)\rho^* B_k\beta^* \operatorname{sinc} c\left(B_k\left[f^T(x_0-x)\right]\right) \times e^{+j2k_c\left[f^T(x_0-x)\right]} + \tilde{v}(x)$$

$$\approx \quad (33)$$

$$B_k \operatorname{sinc} c\left(B_k\left[e^T(x_0-x)\right]\right) e^{-j2k_c\left[e^T(x_0-x)\right]} \times [(1+j)\rho\alpha + (1-j)\rho^*\beta^*] + \tilde{v}(x)$$

$$\approx B_k \operatorname{sinc} c\left(B_k\left[e^T(x_0-x)\right]\right) \quad (34)$$

$$e^{-j2k_c\left[e^T(x_0-x)\right]} \times [(1+j)(\gamma-\Delta\gamma)\rho + (1-j)(\gamma^*+\Delta\gamma^*)\rho^*] + \tilde{v}(x).$$

With the complex identities $$\Re\{x\} = \frac{x+x^*}{2} \text{ and } \Im\{x\} = \frac{x-x^*}{2},$$

where $\Re\{x\}$ and $\Im\{x\}$ denote the real and the imaginary part of x, respectively, $I_{cts}(x)$ can be rewritten as simplified as:

$$I_{cts}(x) \approx B_k \operatorname{sinc}\left(B_k\left[e^T(x_0-x)\right]\right)e^{-j2k_c\left[e^T(x_0-x)\right]} \times \quad (35)$$

$$(2\Re\{\rho\gamma\} + 2\Im\{\rho\gamma\} - 2j\Re\{\rho\Delta\gamma\} - 2\Im\{\rho\Delta\gamma\}) + \tilde{v}(x)$$

$$\approx 2B_k \operatorname{sinc}\left(B_k\left[e^T(x_0-x)\right]\right) \times e^{-j2k_c\left[e^T(x_0-x)\right]}(\rho\gamma - j\rho^*\Delta\gamma^*) + \tilde{v}(x) \quad (36)$$

$$\approx 2\rho B_k \gamma \operatorname{sinc}\left(B_k\left[e^T(x_0-x)\right]\right) \times e^{-j2k_c\left[e^T(x_0-x)\right]}\left(1 - j\frac{\rho^*\Delta\gamma^*}{\rho\gamma}\right) + \tilde{v}(x). \quad (37)$$

Note that $$\frac{\rho^*}{\rho} = e^{-2\angle\rho},$$

where $\angle\rho$ is the angle of the $\rho$ phasor.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 11:
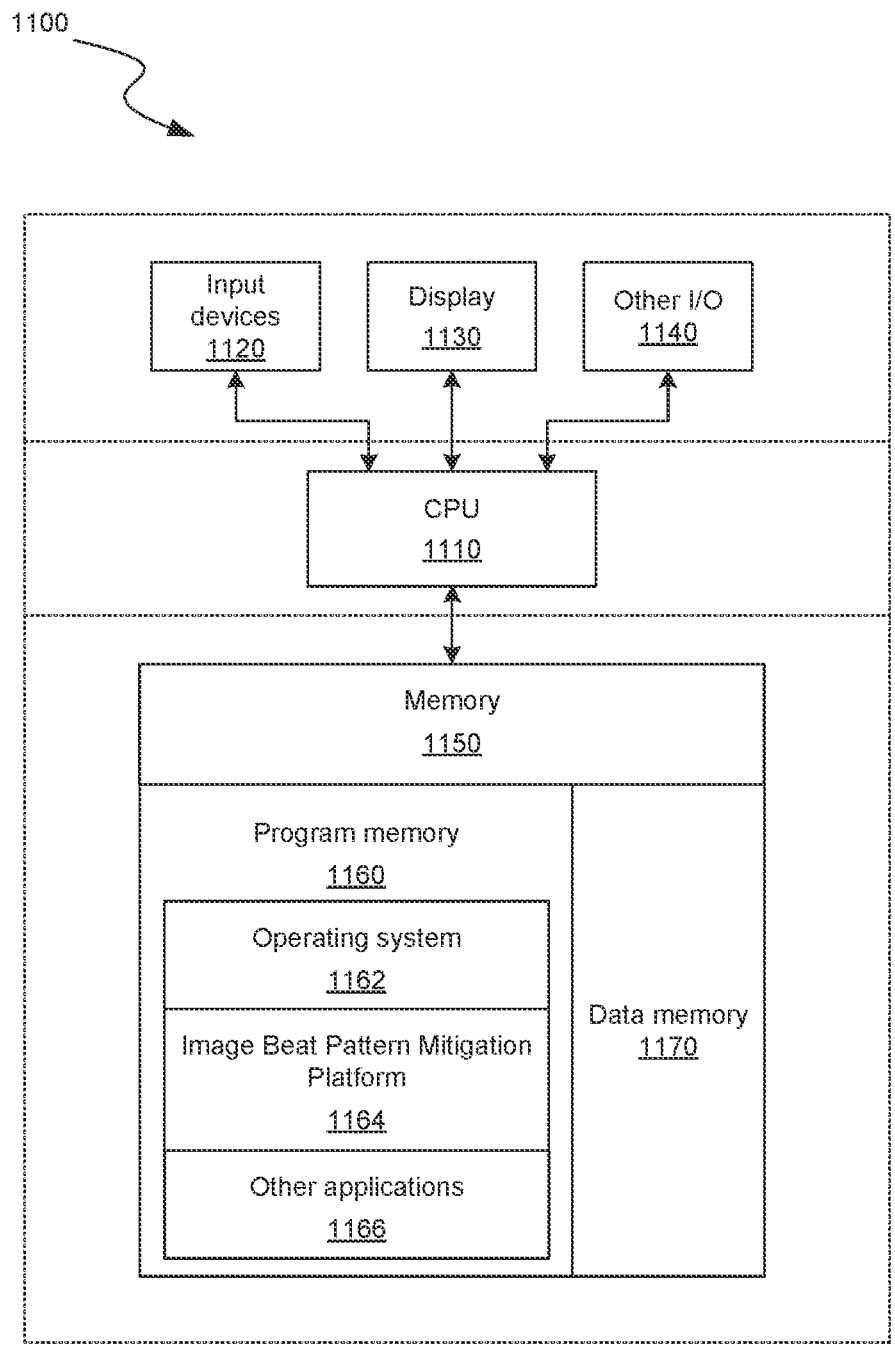
FIG. 11 is a block diagram illustrating an overview of devices on which some implementations of the disclosed technology can operate.

Several implementations are discussed below in more detail in reference to the figures. FIG. 11 is a block diagram illustrating an overview of devices on which some implementations of the disclosed technology can operate. The devices can comprise hardware components of a device 1100 that captures mmWave images, for example. Device 1100 can include one or more input devices 1120 that provide input to the CPU (processor) 1110, notifying it of actions. The actions are typically mediated by a hardware controller that interprets the signals received from the input device and communicates the information to the CPU 1110 using a communication protocol. Input devices 1120 include, for example, a mouse, a keyboard, a touchscreen, a mmWave imaging sensor (e.g., a K-band mmWave imaging sensor operating at or near 24 GHZ), an infrared sensor, a touchpad, a wearable input device, a camera or image-based input device, a microphone, or other user input devices.

CPU 1110 can be a single processing unit or multiple processing units in a device or distributed across multiple devices. CPU 1110 can be coupled to other hardware devices, for example, with the use of a bus, such as a PCI bus or SCSI bus. The CPU 1110 can communicate with a hardware controller for devices, such as for a display 1130. Display 830 can be used to display text and graphics. In some examples, display 1130 provides graphical and textual visual feedback to a user. In some implementations, display 1130 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1140 can also be coupled to the processor, such as a network card, video card, audio card, USB, FireWire or other external device, sensor, camera, printer, speakers, CD-ROM drive, DVD drive, disk drive, or Blu-Ray device. In some examples, I/O devices 1140 may also include a control of the velocity of a robotic material handling system or a conveyor belt.

In some implementations, the device 1100 also includes a communication device capable of communicating wirelessly or wire-based with a network node. The communication device can communicate with another device or a server through a network using, for example, TCP/IP protocols. Device 1100 can utilize the communication device to distribute operations across multiple network devices.

The CPU 1110 can have access to a memory 1150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1150 can include program memory 1160 that stores programs and software, such as an operating system 1162, image beat pattern mitigation platform 1164, and other application programs 1166. Memory 1150 can also include data memory 1170 that can include database information, etc., which can be provided to the program memory 1160 or any element of the device 1100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 12:
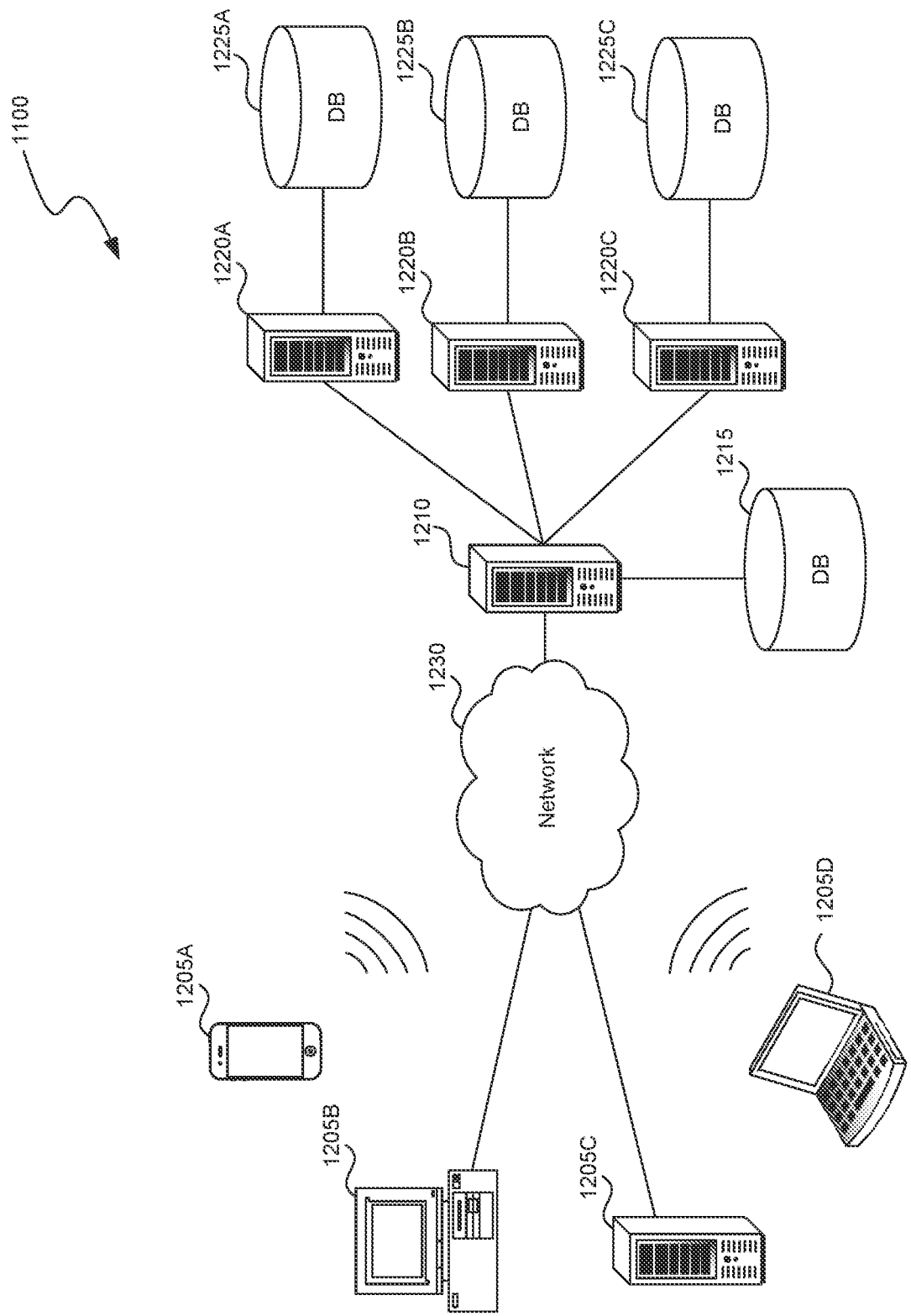
FIG. 12 is a block diagram illustrating an overview of an environment in which some implementations of the disclosed technology can operate.

FIG. 12 is a block diagram illustrating an overview of an environment 1200 in which some implementations of the disclosed technology can operate. Environment 1200 can include one or more client computing devices 1205A-D, examples of which can include device 1200. Client computing devices 1205 can operate in a networked environment using logical connections through network 1230 to one or more remote computers, such as a server computing device 1210.

In some implementations, server computing device 1210 can be an edge server that receives client requests and coordinates fulfillment of those requests through other servers, such as servers 1220A-C. Server computing devices 1210 and 1220 can comprise computing systems, such as device 1100. Though each server computing device 1210 and 1220 is displayed logically as a single server, server computing devices can each be a distributed computing environment encompassing multiple computing devices located at the same or at geographically disparate physical locations. In some implementations, each server computing device 1220 corresponds to a group of servers.

Client computing devices 1205 and server computing devices 1210 and 1220 can each act as a server or client to other server/client devices. Server 1210 can connect to a database 1215. Servers 1220A-C can each connect to a corresponding database 1225A-C. As discussed above, each server 1220 can correspond to a group of servers, and each of these servers can share a database or can have their own database. Databases 1215 and 1225 can warehouse (e.g., store) information. Though databases 1215 and 1225 are displayed logically as single units, databases 1215 and 1225 can each be a distributed computing environment encompassing multiple computing devices, can be located within their corresponding server, or can be located at the same or at geographically disparate physical locations.

Network 1230 can be a local area network (LAN) or a wide area network (WAN), but can also be other wired or wireless networks. Network 1230 may be the Internet or some other public or private network. Client computing devices 1205 can be connected to network 1230 through a network interface, such as by wired or wireless communication. While the connections between server 1210 and servers 1220 are shown as separate connections, these connections can be any kind of local, wide area, wired, or wireless network, including network 1230 or a separate public or private network.

Figure 13:
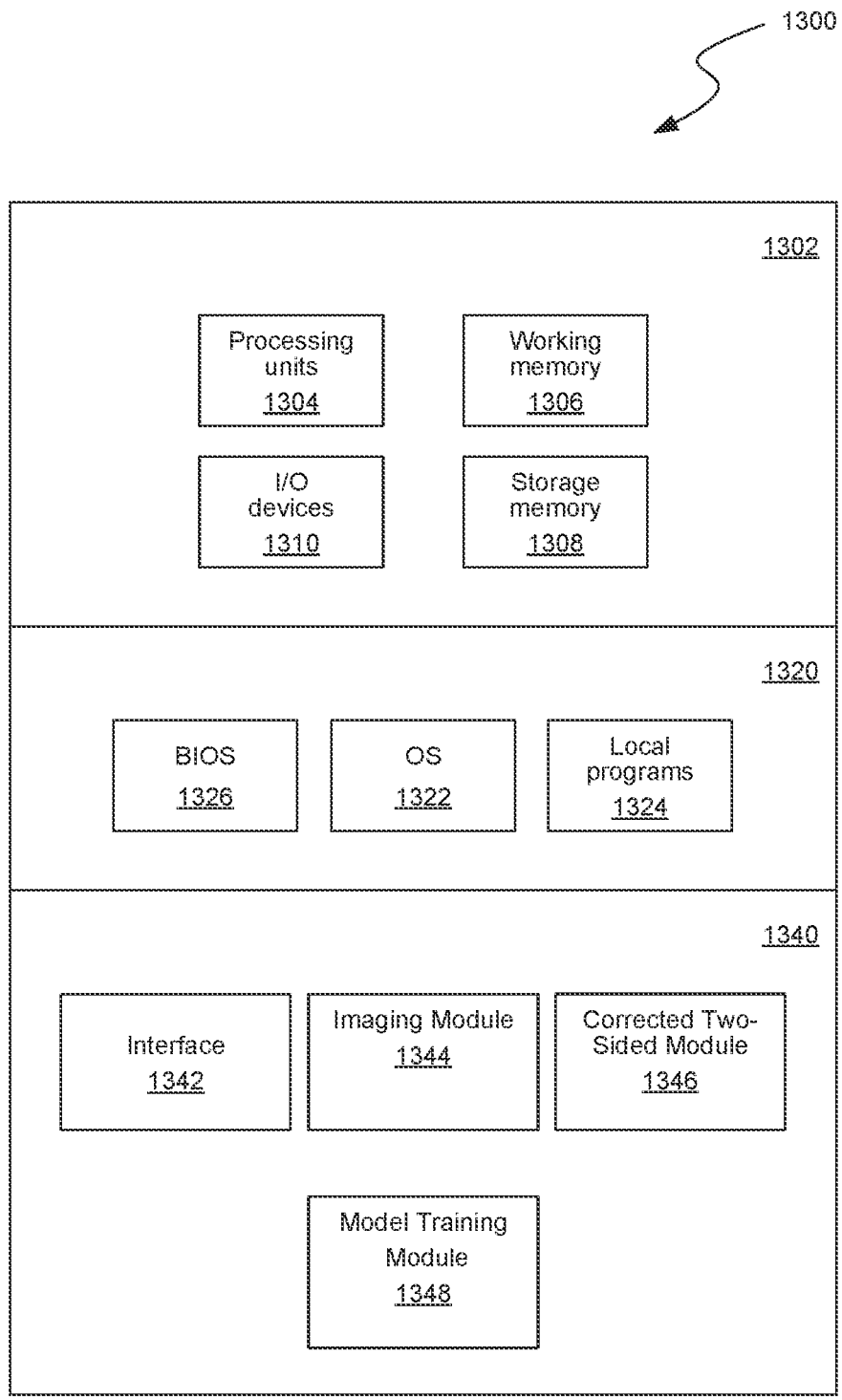
FIG. 13 is a block diagram illustrating components which, in some implementations, can be used in a system employing the disclosed technology.

FIG. 13 is a block diagram illustrating components 1300 which, in some implementations, can be used in a system employing the disclosed technology. The components 1000 include hardware 1302, general software 1320, and specialized components 1340. As discussed above, a system implementing the disclosed technology can use various hardware, including processing units 1304 (e.g., CPUs, GPUs, APUs, etc.), working memory 1306, storage memory 1308, and input and output devices 1310. Components 1300 can be implemented in a client computing device such as client computing devices 1305 or on a server computing device, such as server computing device 1210.

General software 1320 can include various applications, including an operating system 1322, local programs 1324, and a basic input output system (BIOS) 1326. Specialized components 1340 can be subcomponents of a general software application 1320, such as local programs 1324. Specialized components 1340 can include an Imaging Module 1344, a Velocity Extraction Module 1346, a Velocity Profile Module 1348, an Image Reconstruction Module 1350, and components that can be used for transferring data and controlling the specialized components, such as interface 1342. In some implementations, components 1300 can be in a computing system that is distributed across multiple computing devices or can be an interface to a server-based application executing one or more of specialized components 1340.

Those skilled in the art will appreciate that the components illustrated in FIGS. 11-13 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

CONCLUSIONS

The results presented here demonstrate that image quality may depend on knowledge of the precise motion of the object being imaged over the field of view of the mmWave imaging system. Quantitative measurements of image focus, such as the total power and the histogram range, may show improvement when the motion profile of the imaged object is taken into account-even when the velocity of the object is close to constant. The degree of improvement may be even greater when larger variations in velocity are present.

In real-world commercial and industrial applications, the objects to be imaged may move at inconsistent speeds for a variety of reasons, and the motion may be accounted for by the radar imaging system in order to produce images. The use of motion vectors extracted from an optical camera located adjacent to the imaging array may yield beneficial results and allow for a variety of velocity profiles to be corrected in real time. A combined motion-estimation and radar imaging system may be utilized for high-throughput scanning applications for scenes of non-constant velocity.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for producing three-dimensional millimeter wave images of an object, the system comprising:
   a first array of millimeter wave transmitting and receiving antennas arranged in a first plane and operative to provide first image data;
   a second array of millimeter wave transmitting and receiving antennas arranged in a second plane and operative to provide second image data, wherein the first place and the second plane are disposed approximately parallel to each other, the object is disposed between the first array and the second array, and the first image data and the second image data comprise complex-valued millimeter wave reflectivity of the object; and
   an image reconstruction processor configured to combine the first image data and the second image data using a beat pattern correction operator to yield the three-dimensional image of the object, wherein the beat pattern correction operator comprises a sum of the first image data with a conjugate of the second image data, wherein the first image data is weighted by a first phase correction term and the second image data is weighted by a second phase correction term.

2. The system of claim 1 wherein the first phase correction term comprises a sum (1+j) and the second phase correction term comprises a sum (1−j), wherein j represents an imaginary unit.

3. The system of claim 1 wherein the first plane and the second plane are disposed on opposite sides of a conveyor.

4. The system of claim 1 wherein the object is contained within a non-metallic container.

5. The system of claim 1 wherein the image reconstruction processor employs a matched filter reconstruction algorithm to combine the first image data and the second image data using the beat pattern correction operator.

6. The system of claim 1 wherein the first array comprises millimeter wave transmitting and receiving antennas organized into two columns and arranged on the first plane and the second array comprises millimeter wave transmitting and receiving antennas organized into two columns and arranged on the second plane.

7. The system of claim 3 wherein a motion of the conveyor is parallel to the first plane and parallel to the second plane.

8. The system of claim 1 wherein the object is carried by a robot traveling between the first plane and the second plane.

9. A method for correcting image beat patterns in a three-dimensional millimeter wave image of an object, the method comprising:
   receiving first image data from a first array of millimeter wave transmitting and receiving antennas arranged in a first plane;
   receiving second image data from a second array of millimeter wave transmitting and receiving antennas arranged in a second plane, wherein the first plane and the second plane are disposed approximately parallel to each other, the object is disposed between the first array and the second array, and the first image data and the second image data comprise complex-valued millimeter wave reflectivity of the object; and
   combining, by an image reconstruction processor, the first image data and the second image data using a beat pattern correction operator to yield the three-dimensional image of the object, wherein the beat pattern correction operator comprises a sum of the first image data with a conjugate of the second image data, wherein the first image data is weighted by a first phase correction term and the second image data is weighted by a second phase correction term.

10. The method of claim 9 wherein the first phase correction term comprises a sum (1+j) and the second phase correction term comprises a sum (1−j), wherein j represents an imaginary unit.

11. The method of claim 9 wherein the first plane and the second plane are disposed on opposite sides of a conveyor.

12. The method of claim 9 wherein the object is contained within a non-metallic container.

13. The method of claim 9 wherein the combining of the first image data and the second image data is performed by the image reconstruction processor employing a matched filter reconstruction algorithm.

* * * * *